(12) United States Patent
Park et al.

(10) Patent No.: US 12,488,750 B2
(45) Date of Patent: Dec. 2, 2025

(54) DISPLAY DEVICE

(71) Applicant: SAMSUNG DISPLAY CO., LTD., Yongin-si (KR)

(72) Inventors: Hyang A Park, Yongin-si (KR); Sang Woo Kim, Yongin-si (KR); Jung Woo Park, Yongin-si (KR); Soo Yeong Hong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/596,777

(22) Filed: Mar. 6, 2024

(65) Prior Publication Data

US 2024/0312407 A1 Sep. 19, 2024

(30) Foreign Application Priority Data

Mar. 16, 2023 (KR) ........................ 10-2023-0034398

(51) Int. Cl.
*G09G 3/3233* (2016.01)
*G06V 40/13* (2022.01)
*H10K 39/34* (2023.01)
*H10K 59/121* (2023.01)

(52) U.S. Cl.
CPC ....... *G09G 3/3233* (2013.01); *G06V 40/1318* (2022.01); *H10K 39/34* (2023.02); *H10K 59/1213* (2023.02); *G09G 2300/0426* (2013.01); *G09G 2300/0819* (2013.01); *G09G 2300/0852* (2013.01); *G09G 2300/0861* (2013.01); *G09G 2310/08* (2013.01); *G09G 2354/00* (2013.01); *G09G 2360/14* (2013.01)

(58) Field of Classification Search
None
See application file for complete search history.

(56) References Cited

U.S. PATENT DOCUMENTS

2020/0051499 A1* 2/2020 Chung .................. G09G 5/377
2021/0200366 A1* 7/2021 Bok ....................... G06V 10/17

* cited by examiner

*Primary Examiner* — Stephen T. Reed
(74) *Attorney, Agent, or Firm* — F. CHAU & ASSOCIATES, LLC

(57) ABSTRACT

A display device may include photo sensors connected to a readout line. Each of the photo sensors may include: a light receiving element; a first sensor transistor configured to control current flowing to the readout line in response to a voltage of one electrode of the light receiving element; and a second sensor transistor electrically connected between the first sensor transistor and the readout line. The first sensor transistor may include a silicon semiconductor. The second sensor transistor may include an oxide semiconductor.

15 Claims, 14 Drawing Sheets

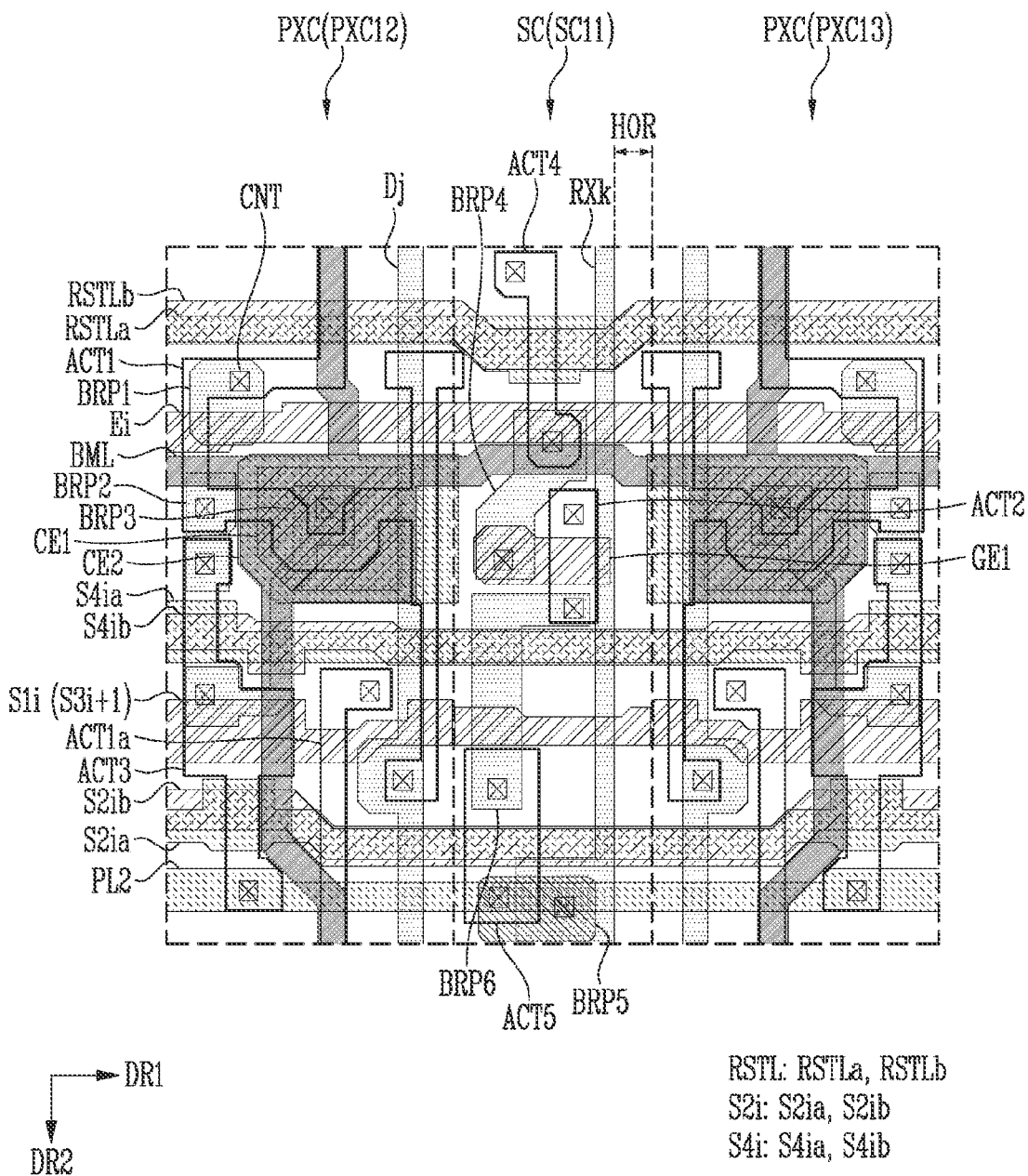

DISPLAY DEVICE

CROSS-REFERENCE TO RELATED APPLICATION

The present application claims priority to Korean patent application number 10-2023-0034398, filed on Mar. 16, 2023, the entire disclosure of which is incorporated by reference herein in its entirety.

BACKGROUND

1. Field of Invention

Various embodiments of the present disclosure relate to a display device.

2. Description of Related Art

Many electronic devices include displays. Examples include smartphones, digital cameras, notebook computers, navigation devices, and smart televisions. More recent displays include a biometric sensor for security purposes. For example, the biometric sensor may sense fingerprints in association with a display panel having a large surface area.

SUMMARY

Various embodiments of the present disclosure are directed to a display device which includes a biometric sensor, having improved sensing sensitivity, and/or high resolution. The objects of the present disclosure are not limited to the above-stated object, and those skilled in the art will clearly understand other not-mentioned objects as stated herein.

An embodiment of the present disclosure may provide a display device, including a pixel and a photo sensor. The pixel may include: a light emitting element; a first transistor configured to control driving current flowing through the light emitting element in response to a voltage of a first node; and a second transistor configured to transmit a data signal from a data line to the first node in response to a scan signal provided to a first scan line. The photo sensor may include: a light receiving element; a first sensor transistor configured to control current flowing to a readout line in response to a voltage of one electrode of the light receiving element; and a second sensor transistor electrically connected between the first sensor transistor and the readout line. The first sensor transistor may include a first type semiconductor. The second sensor transistor may include a second type semiconductor different from the first type semiconductor.

The first sensor transistor may include a silicon semiconductor. The second sensor transistor may include an oxide semiconductor.

A semiconductor layer of the second sensor transistor and a semiconductor layer of the first sensor transistor may be disposed in different layers with at least one insulating layer interposed therebetween.

The photo sensor may be located between the pixel and an adjacent pixel disposed adjacent to the pixel in a first direction. The readout line may extend in a second direction. Each of a semiconductor layer of the first sensor transistor and a semiconductor layer of the second sensor transistor may extend in the second direction.

A length of the semiconductor layer of the second sensor transistor in the second direction may be greater than a width of the semiconductor layer of the second sensor transistor in the first direction.

The photo sensor may further include a third sensor transistor electrically connected between a reference power line and the one electrode of the light receiving element, and including a gate electrode connected to a reset control line. The third sensor transistor may include the second type semiconductor.

The pixel may further include: a third transistor electrically connected between a gate electrode of the first transistor and one electrode of the first transistor, and including a gate electrode connected to a third scan line; and a fourth transistor electrically connected between the gate electrode of the first transistor and a second power line, and including a gate electrode connected to a second scan line. Each of the first transistor and the second transistor may include the first type semiconductor. Each of the third transistor and the fourth transistor may include the second type semiconductor.

A gate electrode of the second sensor transistor may be connected to the second scan line.

The second scan line may include a first sub-scan line disposed under a semiconductor layer of the second sensor transistor, and a second sub-scan line disposed over the semiconductor layer of the second sensor transistor.

A gate electrode of the second sensor transistor may be connected to the third scan line.

A gate electrode of the second sensor transistor may be connected to a fourth scan line different from the first to the third scan lines.

The pixel may further include a capacitor electrically connected between the first scan line and a gate electrode of the first transistor.

The capacitor may be formed by overlapping the first scan line and a semiconductor layer located in a same layer as a semiconductor layer of the second sensor transistor.

An embodiment of the present disclosure may provide a display device, including photo sensors connected to a readout line. One of the photo sensors may include: a light receiving element; a first sensor transistor configured to control current flowing to the readout line in response to a voltage of one electrode of the light receiving element; and a second sensor transistor electrically connected between the first sensor transistor and the readout line. The first sensor transistor may include a silicon semiconductor. The second sensor transistor may include an oxide semiconductor.

Each of a semiconductor layer of the first sensor transistor and a semiconductor layer of the second sensor transistor may extend in a direction parallel to a direction in which the readout line extends.

Each of the photo sensors may further include a third sensor transistor electrically connected between a reference power line and the one electrode of the light receiving element, and including a gate electrode connected to a reset control line. The third sensor transistor may include the oxide semiconductor.

The reset control line may be connected in common to the photo sensors.

An embodiment of the present disclosure may provide a display device, including a pixel and a photo sensor. The pixel may include: a light emitting element; a first transistor configured to control driving current flowing through the light emitting element in response to a voltage of a first node; a second transistor electrically connected between a data line and a first electrode of the first transistor, and including a gate electrode connected to a first scan line; a third transistor electrically connected between a gate electrode of the first transistor and a second electrode of the first transistor, and including a gate electrode connected to a third scan line; and a fourth transistor electrically connected between the gate electrode of the first transistor and a second power line, and including a gate electrode connected to a second scan line. The photo sensor may include: a light receiving element; a first sensor transistor configured to control current flowing to a readout line in response to a voltage of one electrode of the light receiving element; and a second sensor transistor electrically connected between the first sensor transistor and the readout line. A gate electrode of the second sensor transistor may be connected to the second scan line or the third scan line.

The gate electrode of the second sensor transistor may be connected to the second scan line.

The gate electrode of the second sensor transistor may be connected to the third scan line.

In accordance with one or more embodiments, a display device includes a pixel and a photo sensor, wherein the pixel and the photo sensor share a scan line, and wherein the scan line is coupled to an first transistor of the pixel and a first transistor of the photo sensor, the first transistor of the pixel is configured to initialize a node coupled to a gate of a second transistor of the pixel, and the first transistor of the photo sensor is coupled between a second transistor of the photo sensor and a readout line.

The second transistor of the pixel may be a driving transistor of the pixel. The second transistor of the photo sensor may have a gate coupled to a light receiving element of the photo sensor.

The first transistor of the photo sensor may include a first semiconductor pattern having a linear shape, the second transistor the photo sensor may include a second semiconductor pattern having a linear shape, and the first semiconductor pattern and the second semiconductor pattern may only extend in a direction parallel to the readout line. The photo sensor may include a third transistor coupled to receive a reset signal, wherein the third transistor may include a third semiconductor pattern having a linear shape extending only in the direction parallel to the readout line.

The first transistor of the photo sensor may be an oxide semiconductor transistor. The pixel and the photo sensor may be configured to be simultaneously scanned based on a signal carried on the scan line. A scan period for the pixel may overlap a sensing scan period of the photo sensor. The photo sensor may be included in a fingerprint sensor.

In accordance with one or more embodiments, a display device includes a pixel and a photo sensor, wherein the pixel and the photo sensor share a scan line, and wherein the scan line is coupled to a first transistor of the pixel and a first transistor of the photo sensor, the first transistor of the pixel is configured to compensate for a threshold voltage of a driving transistor of the pixel, and the first transistor of the photo sensor is coupled between a second transistor of the photo sensor and a readout line.

Details of various embodiments are included in the detailed descriptions and drawings.

BRIEF DESCRIPTION OF THE DRAWINGS

FIGS. 7A, 7B, and 7C are plan views illustrating an embodiment of the display area of FIG. 4.

DETAILED DESCRIPTION

Figure 1:
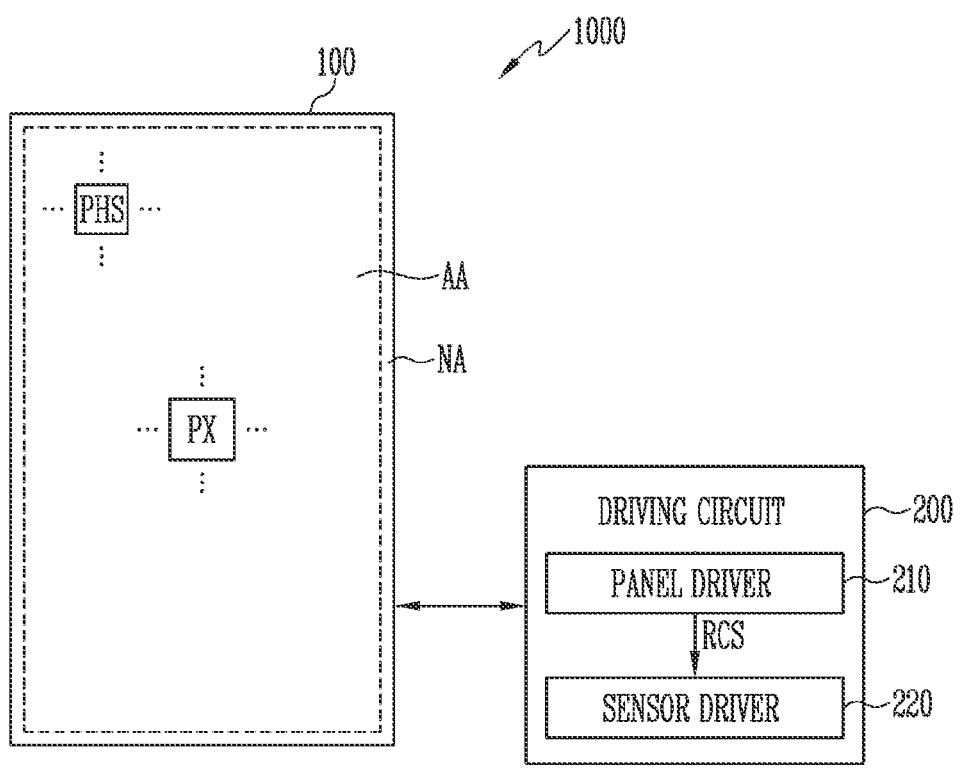
FIG. 1 is a block diagram illustrating a display device in accordance with embodiments of the present disclosure.

Reference will now be made in detail to various embodiments of the present disclosure, specific examples of which are illustrated in the accompanying drawings and described below, since the embodiments of the present disclosure can be variously modified in many different forms. Furthermore, a singular form may include a plural form as long as it is not specifically mentioned in a sentence.

Some embodiments are described in the accompanying drawings in connection with functional blocks, units and/or modules. Those skilled in the art will understand that such blocks, units, and/or modules are physically implemented by logic circuits, discrete components, microprocessors, hardwired circuits, memory elements, line connections, and other electronic circuits. This may be formed using semiconductor-based fabrication techniques or other fabrication techniques. For blocks, units, and/or modules implemented by a microprocessor or other similar hardware, they may be programmed and controlled using software to perform various functions discussed herein, and may be optionally driven by firmware and/or software. In addition, each block, unit, and/or module may be implemented by dedicated hardware, or be implemented by a combination of the dedicated hardware which performs some functions and a processor which performs different functions (e.g. one or more programmed microprocessors and related circuits). Furthermore, in some embodiments, blocks, units and/or modules may be physically separated into two or more individual blocks, units and/or modules which interact with each other without departing from the scope of the inventive concept. In some embodiments, blocks, units and/or modules may be physically combined into more complex blocks, units and/or modules without departing from the scope of the inventive concept.

However, the present disclosure is not limited to the following embodiments and may be modified into various forms. Each embodiment to be described below may be implemented alone, or combined with at least another embodiment to make various combinations of embodiments.

Some elements which are not directly related to the features of the present disclosure in the drawings may be omitted to clearly explain the present disclosure. Furthermore, the sizes, ratios, etc. of some elements in the drawings may be slightly exaggerated. It should be noted that the same reference numerals are used to designate the same or similar elements throughout the drawings, and repetitive explanation will be omitted.

FIG. 1 is a block diagram illustrating a display device 1000 in accordance with embodiments of the present disclosure. The display device 1000 may be implemented as a self-emissive display device including a plurality of self-emissive elements. For example, the display device 1000 may be an organic light emitting display device including organic light emitting elements. However, the foregoing is only for illustrative purposes, and the display device 1000 may be implemented as another type of display device including, but not limited to, a display device including inorganic light emitting elements, a display device including light emitting elements formed of a combination of inorganic material and organic material, or a display device which uses quantum dots to display an image.

The display device 1000 may be a flat display device, a flexible display device, a curved display device, a foldable display device, a bendable display device, or a rollable display device. Furthermore, the display device 100 may be applied to a transparent display device, a head-mounted display device, a wearable display device, or the like.

Referring to FIG. 1, in an embodiment, the driving circuit 200 may include a panel driver 210 and a sensor driver 220. The display panel 100 includes a display area AA and a non-display area NA. The display area AA may include pixels PX. Each pixel PX may be referred to as a sub-pixel or a light-emitting pixel. Each of the pixels PX may include at least one light emitting element. For example, the light emitting element may include a light emitting layer (e.g., an organic light emitting layer). An area of the light emitting element which emits light may correspond to a light emitting area. The display device 1000 may drive the pixels PX in response to image data, thus displaying an image on the display area AA.

The non-display area NA may be provided around the display area AA. In an embodiment, the non-display area NA may collectively refer to an area of the display panel 100 other than the display area AA. For example, the non-display area NA may include a line area, a pad area, and various dummy areas, and/or in some embodiments may correspond to a bezel area.

In an embodiment, a photo sensor PHS may be included in the display area AA. The photo sensor PHS may be referred to as a sensor pixel. The photo sensor PHS may include a light receiving element including a light receiving layer. The light receiving layer of the light receiving element in the display area AA may be disposed at a position spaced apart from the light emitting layer of the light emitting element.

In an embodiment, a plurality of photo sensors PHS may be distributed to be spaced apart from each other in the overall area of the display area AA. However, this is only for illustrative purposes, and only a portion of the display area AA may be set to a certain sensing area. In this case, the photo sensors PHS may be provided in the corresponding sensing area. In one embodiment, a photo sensor PHS may also be included in at least a portion of the non-display area NA.

In an embodiment, the photo sensor PHS may sense that light emitted from a light source (e.g., a light emitting element of the pixel PX) is reflected by an external object (e.g., the finger of a user, iris, etc.). For example, the fingerprint of the user may be sensed by the photo sensor PHS. Although hereinafter the photo sensor PHS will be described as being used for fingerprint sensing by way of example, the photo sensor PHS may sense various types of biometric information such as, but not limited to, iris information or vein information.

The driving circuit 200 may include a panel driver 210 and a sensor driver 220. For example, the panel driver 210 and the sensor driver 220 may be implemented as integrated circuits that are independent from each other. In one embodiment, the driving circuit 200 may be implemented as a single integrated circuit. For instance, at least a portion of the senor driver 220 may be included in the panel driver 210 or be interlocked with the panel driver 210.

The panel driver 210 may scan the pixels PX of the display area AA, and supply data signals corresponding to image data (or an image) to the pixels PX. The display panel 100 may display an image corresponding to the data signals.

In an embodiment, the panel driver 210 may supply a driving signal for light sensing (e.g., fingerprint sensing) to the pixel PX. The driving signal may be provided to cause a pixel PX to emit light and operate as a light source for the photo sensor PHS. In an embodiment, the panel driver 210 may also supply the driving signal and/or another driving signal for light sensing to the photo sensor PHS. However, this is only for illustrative purposes, and driving signals for light sensing may be provided by the sensor driver 220.

The sensor driver 220 may detect biometric information related to the user (e.g., a fingerprint of the user or the like) based on a sensing signal received from the photo sensor PHS. In an embodiment, the sensor driver 220 may supply the driving signals to the photo sensor PHS and/or the pixel PX.

In an embodiment, the panel driver 210 may provide a readout control signal RCS to the sensor driver 220. In cooperation with the panel driver 210, the sensor driver 220 may read out (or sample) a sensing signal based on the readout control signal RCS. For example, the sensor driver 220 may read out or sample the sensing signal in the units of at least one pixel row (or a horizontal line) in response to the readout control signal RCS.

Figure 2:
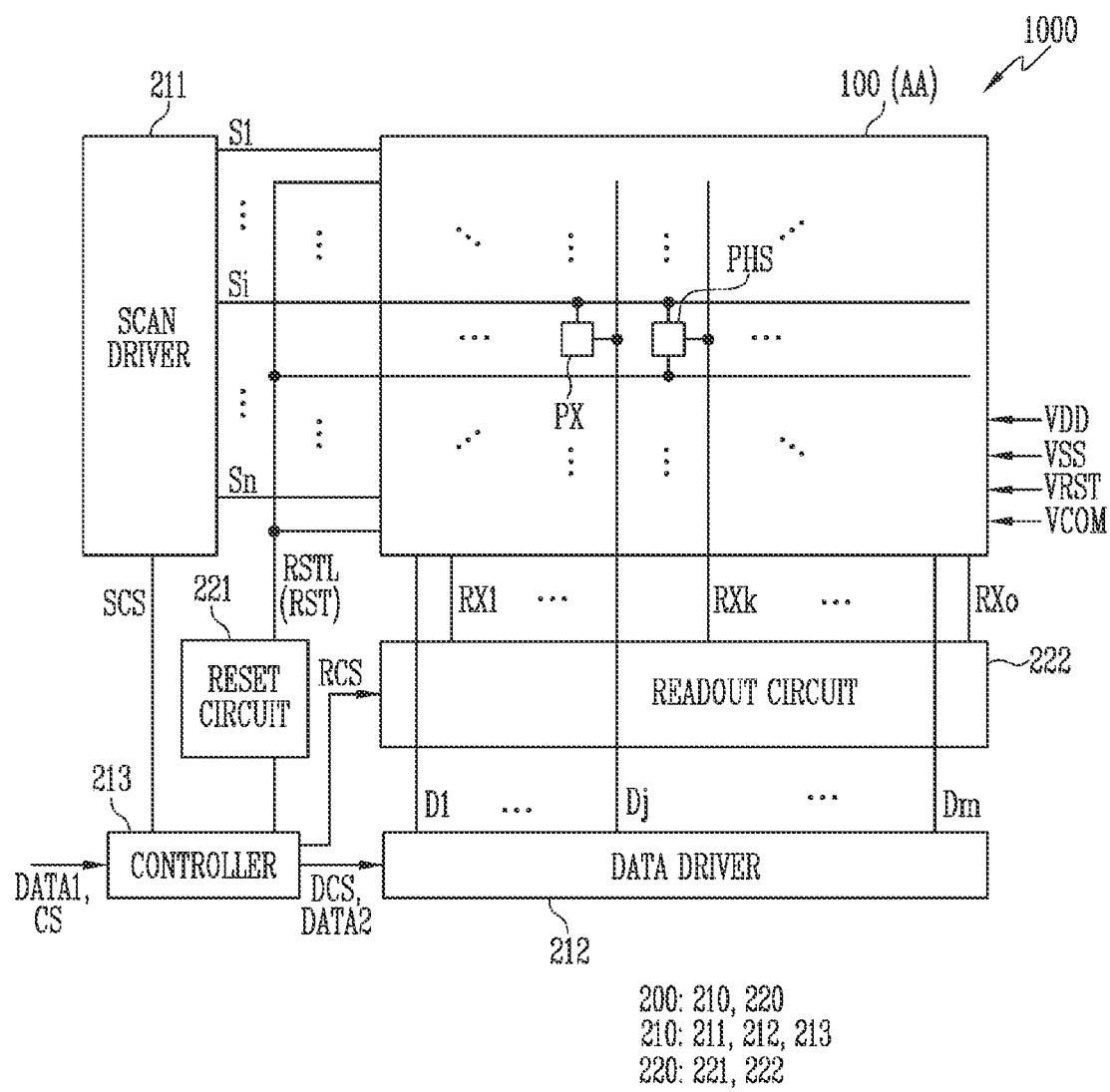
FIG. 2 is a block diagram illustrating an embodiment of the display device of FIG. 1.

FIG. 2 is a block diagram illustrating an embodiment of the display device 1000 of FIG. 1.

Referring to FIGS. 1 and 2, the display panel 100 may include signal lines, one or more pixels PX, and one or more photo sensors PHS. The signal lines may include scan lines S1 to Sn, data lines D1 to Dm, readout lines RX1 to RXo, and a reset control line RSTL (or a reset line). Here, n, m, and o may be natural numbers.

Each pixel PX may be disposed or located in an area (e.g., a pixel area) defined by the scan lines S1 to Sn and the data lines D1 to Dm. Each photo sensor PHS may be disposed or located in an area defined by the scan lines S1 to Sn and the readout lines RX1 to RXo. The pixels PX and the photo sensors PHS may be arranged in a two-dimensional array in the display area AA of the display panel 100, but the present disclosure is not limited thereto.

Each pixel PX may be electrically connected to at least one of the scan lines S1 to Sn and one of the data lines D1 to Dm. Each photo sensor PHS may be electrically connected to one of the scan lines S1 to Sn, one of the readout lines RX1 to RXo, and the reset control line RSTL. An example embodiment of the connection configuration between the pixel PX, the photo sensor PHS, and the signal lines will be described below with reference to FIG. 5.

Power voltages VDD, VSS, VRST, and VCOM to drive the pixel PX and the photo sensor PHS may be provided to the display panel 100. The power voltages VDD, VSS, VRST, and VCOM may be provided from a power supply. The power supply may be implemented as a power management IC (PMIC).

The driving circuit 200 may include a scan driver 211 (or a gate driver), a data driver 212 (or a source driver), a controller 213 (or a timing controller, or a second processor), a reset circuit 221 (or a reset component), a readout circuit 222 (or a readout component). For example, the scan driver 211, the data driver 212, and the controller 213 may be included in the panel driver 210. The reset circuit 221 and the readout circuit 222 may be included in the sensor driver 220. However, the present disclosure is not limited thereto. For example, the reset circuit 221 may be included in the panel driver 210.

The scan driver 211 may be electrically connected to the pixels PX and the photo sensors PHS by corresponding scan lines S1 to Sn. The scan driver 211 may generate scan signals based on a scan control signal SCS (or a gate control signal) and may provide the scan signals to the scan lines S1 to Sn. The scan control signal SCS may include, for example, a start signal, clock signals, and the like, and may be provided from the controller 213 to the scan driver 211. For example, the scan driver 211 may be implemented as a shift register configured to successively shift a pulse-type start signal based on the clock signals and generate and output scan signals. The scan driver 211 may scan the display panel 100 and selectively drive the pixels PX and the photo sensors PHS.

The scan driver 211 and the pixels PX may be formed in the display panel 100. However, the scan driver 211 is not limited thereto. For example, the scan driver 211 may be implemented as an integrated circuit.

A pixel PX that is selected and driven by the scan driver 211 may emit light at a luminance corresponding to a data signal provided from the data line. The photo sensor PHS, that is selected and driven by the scan driver 211, may output, to the corresponding readout line, an electrical signal (e.g., a sensing signal, for example, current/voltage) corresponding to sensed light. For example, the pixel PX that is selected and driven through an i-th scan line Si may emit light at a luminance corresponding to a data signal provided to a j-th data line Dj (here, i and j each are a natural number). For example, the photo sensor PHS that is selected and driven through the i-th scan line Si may output, to a k-th readout line RXk (here, k is a natural number), an electrical signal corresponding to the sensed light.

The data driver 212 may generate data signals (or data voltages) based on image data DATA2 and a data control signal DCS that are provided from the controller 213, and may provide the data signals to the display panel 100 (or the pixels PX) through respective data lines D1 to Dm. The data control signal DCS may be a signal for controlling operation of the data driver 212, and, for example, may include a data enable signal (or a load signal) for instructing a valid data signal to be output, a horizontal start signal, a data clock signal, and the like. For example, the data driver 212 may include a shift register, a latch, a digital-to-analog converter, and a buffer. The shift register may be configured to shift a horizontal start signal in synchronization with the data clock signal and generate a sampling signal. The latch may latch the image data DATA2 in response to the sampling signal. The digital-to-analog converter (or a decoder) may be configured to convert the latched image data (e.g., digital data) to an analog data signal. The buffer (or an amplifier) may be configured to output the data signal to the data line (e.g., the j-th data line Dj).

The controller 213 may receive input image data DATA1 and a control signal CS from an external device (e.g., a graphic processor, an application processor, or a first processor), generate a scan control signal SCS and a data control signal DCS based on the control signal CS, and generate image data DATA2 by converting the input image data DATA1. Here, the control signal CS may include a vertical synchronization signal, a horizontal synchronization signal, a reference clock signal, and the like. The vertical synchronization signal may refer to a start of frame data (e.g., data corresponding to a frame period in which one frame image is displayed). The horizontal synchronization signal may refer to a start of a data row (e.g., one data row among a plurality of data rows included in the frame data). The controller 213 may convert the input image data DATA1 to the image data DATA2 having a format corresponding to pixel arrangement in the display panel 100. Furthermore, the controller 213 may generate a reset control signal and a readout control signal RCS based on the control signal CS.

The reset circuit 221 may be connected in common to all of the photo sensors PHS provided in the display panel 100 through one reset control line RSTL. The reset circuit 221 may simultaneously provide a reset signal RST (or a reset control signal) to all of the photo sensors PHS in response to the reset control signal. The reset signal RST may be a control signal for providing a reset voltage VRST to the photo sensors PHS. Because the reset signal RST is simultaneously provided to all of the photo sensors PHS, the reset signal RST may be referred to as a global reset signal.

The readout circuit 222 may receive sensing signals from the photo sensors PHS through the readout lines RX1 to RXo, and perform a signal processing operation for the sensing signals. For example, the readout circuit 222 may perform a correlated double sampling (CDS) operation to remove noise from the sensing signals provided from the photo sensors PHS. The readout circuit 222 may perform the CDS operation in response to the readout control signal RCS. For example, the timing of the CDS operation of the readout circuit 222 may be determined by the readout control signal RCS. Furthermore, the readout circuit 222 may convert an analog sensing signal to a digital signal (or a digital value). The configuration for the CDS operation and the analog-digital conversion may be provided for each of the readout lines RX1 to RXo. The readout circuit 222 may process in parallel the sensing signals provided from the readout lines RX1 to RXo.

The processed sensing signals (e.g., the readout sensing signal) may be provided to an external device (e.g., an application processor) as a piece of sensing data (or biometric information), so that biometric authentication (e.g., fingerprint authentication) may be performed based on the sensing data. On the other hand, the readout sensing signals may be provided to the controller 213, so that biometric authentication may be performed in the controller 213.

Figure 3:
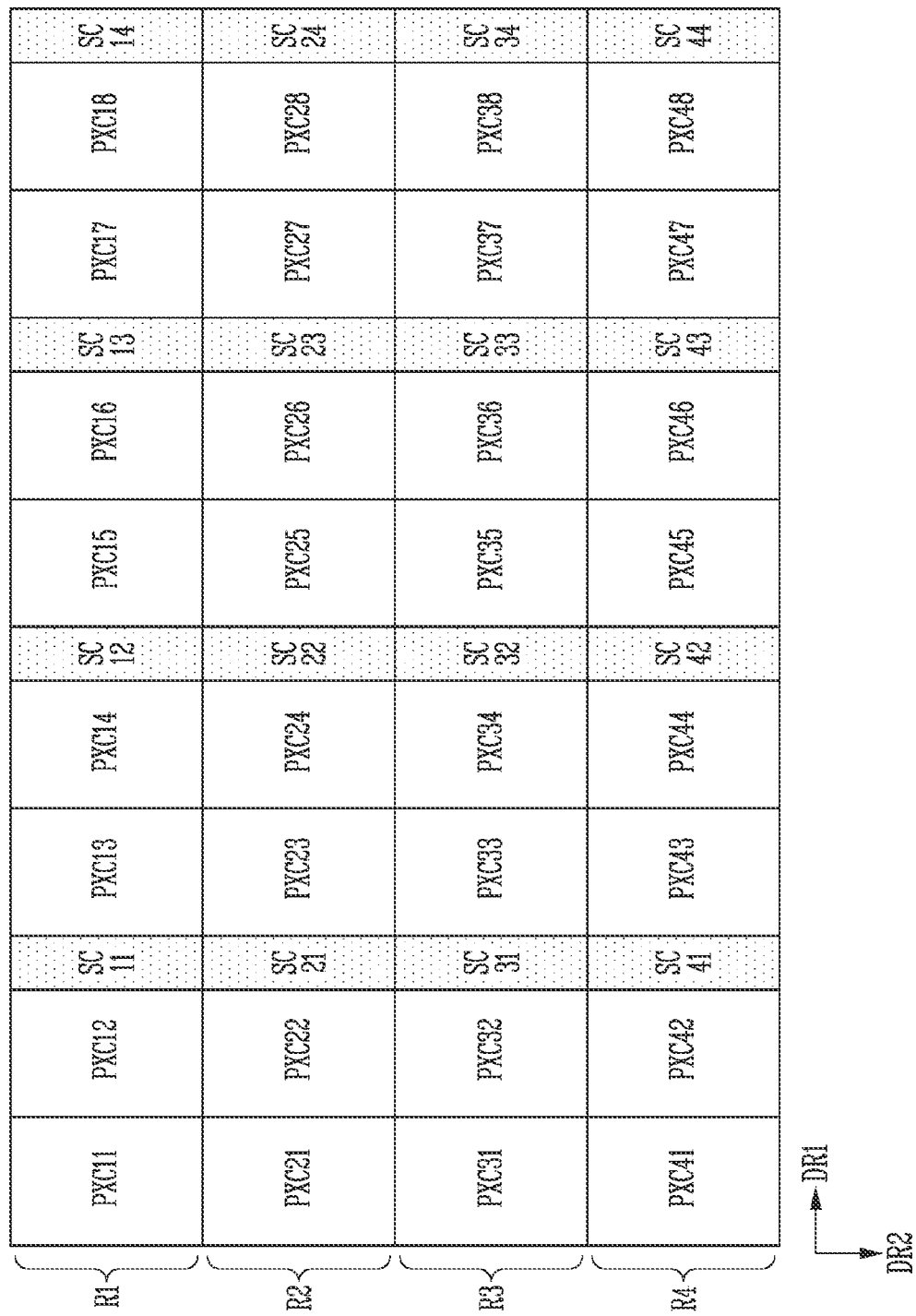
FIG. 3 is a diagram illustrating an example embodiment of backplane circuits of a display area of a display panel of the display device of FIG. 2.
Figure 4:
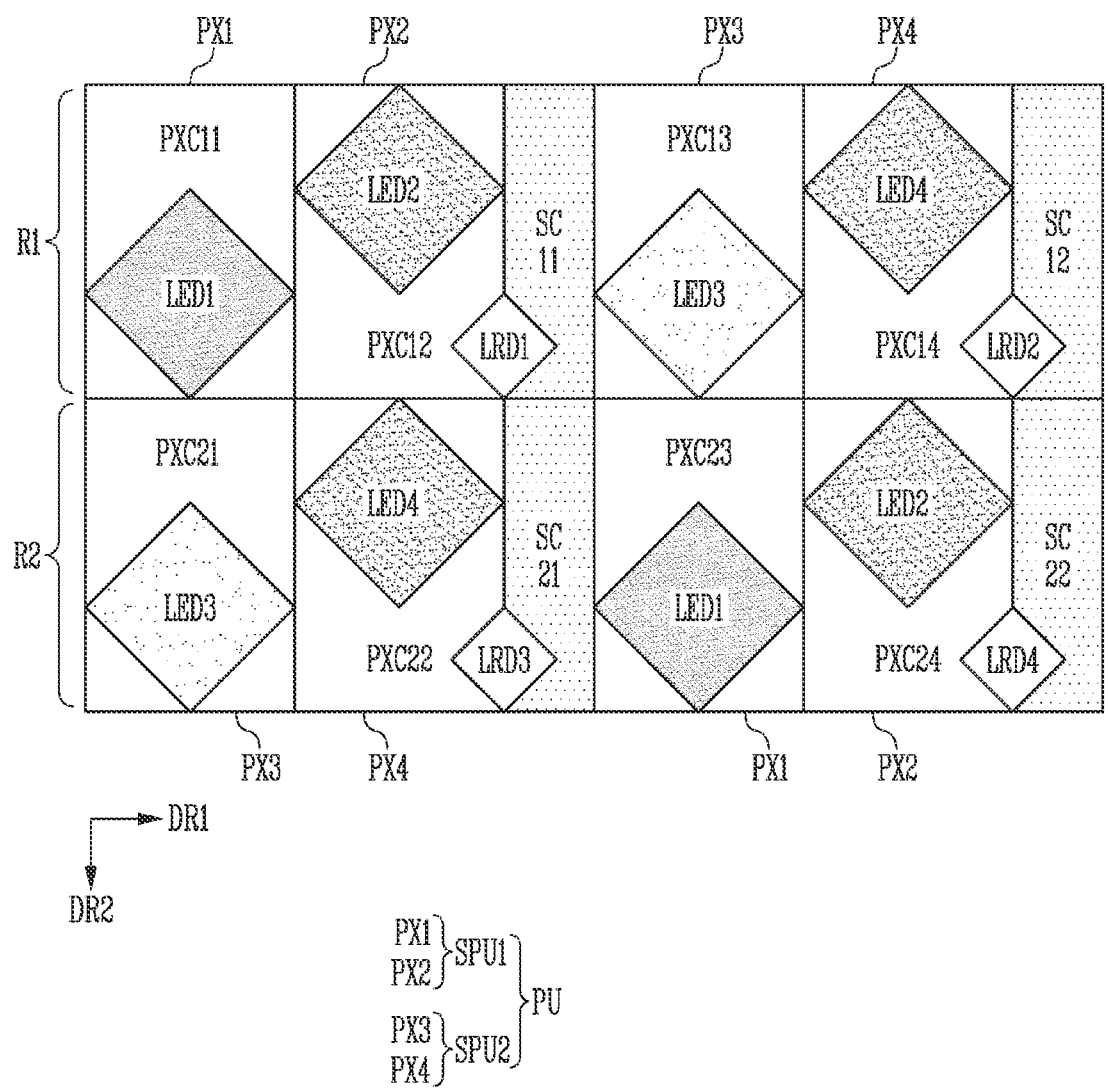
FIG. 4 is a diagram illustrating an example embodiment of the display area of the display panel included in the display device of FIG. 2.

FIG. 3 is a diagram illustrating an example embodiment of arrangement of backplane circuits of the display area AA of the display panel 100 that may be included in the display device 1000 of FIG. 2. FIG. 4 is a diagram illustrating an example of the display area AA of the display panel 100 included in the display device 1000 of FIG. 2.

Referring to FIGS. 1 to 4, pixels PX1 to PX4 and a plurality of photo sensors PHS may be disposed in the display area AA of the display panel 100. The display area AA may be divided into pixel rows R1 to R4. Each of the pixel rows R1 to R4 may extend in a first direction DR1 and may be arranged in a second direction DR2. Each of the pixel rows R1 to R4 may include pixels PX1 to PX4. Each of the pixels PX1 to PX4 may include one of pixel circuits PXC11 to PXC48 and one of light emitting elements LED1 to LED4.

In an embodiment, the first pixel PX1, the second pixel PX2, and the third pixel PX3 may respectively emit first color light, second color light, and third color light. The first color light, the second color light, and the third color light may be different colors of light. Each of the first color light, the second color light, and the third color light may be one of red light, green light, or blue light. The first color light, the second color light, and the third color light may be a different combination of colors in another embodiment. In an embodiment, the fourth pixel PX4 may emit the same color of light as that of the second pixel PX2. For example, the first light emitting element LED1 may emit the first color light. The second light emitting element LED2 and the fourth light emitting element LED4 may emit the second color light. The third light emitting element LED3 may emit the third color light.

In FIG. 4, each of the light emitting elements LED1 to LED4 may include a light emitting area corresponding to a light emitting layer. As shown, the light emitting elements LED1 to LED4 are in a predetermined arrangement, as discussed below. The foregoing is only for convenience of explanation, and the color of light emitted from each of the light emitting elements LED1 to LED4, or the position, surface area, shape, or the like of the light emitting elements LED1 to LED4 may be different in another embodiment.

In an embodiment, the pixels PX1 to PX4 may be arranged in the first direction DR1 on each of odd-numbered pixel rows including the first pixel row R1 (or a first horizontal line) and the third pixel row R3 (or a third horizontal line). The pixels PX1 to PX4 may be arranged in a sequence of the first pixel PX1 configured to emit red light, the second pixel PX2 configured to emit green light, the third pixel PX3 configured to emit blue light, and the fourth pixel PX4 configured to emit green light.

The pixels PX1 to PX4 may be arranged in the first direction DR1 on each of even-numbered pixel rows including the second pixel row R2 (or a second horizontal line) and the fourth pixel row R4 (or a fourth horizontal line). The pixels PX1 to PX4 may be arranged in a sequence of the third pixel PX3, the fourth pixel PX4, the first pixel PX1, and the second pixel PX2.

In an embodiment, the first pixel PX1 and the second pixel PX2 may form a first sub-pixel unit SPU1. The third pixel PX3 and the fourth pixel PX4 may form a second sub-pixel unit SPU2. Therefore, on each of the odd-numbered pixel rows R1 and R3, the first sub-pixel units SPU1 and the second sub-pixel units SPU2 may be alternately disposed. On each of the even-numbered pixel rows R2 and R4, the second sub-pixel units SPU2 and the first sub-pixel units SPU1 may be alternately disposed, for example, in a pattern opposite to that of the odd-numbered pixel rows R1 and R3.

The first and second sub-pixel units SPU1 and SPU2 that are adjacent to each other may be understood as constituting one pixel unit PU. For example, FIG. 4 illustrates the pixel unit PU of each of the first pixel row R1 and the second pixel row R2. However, this is only for illustrative purposes, and the arrangement of the pixels is not limited thereto. The sub-pixel units may be provided in a different arrangement in other embodiments.

On the first pixel row R1, the pixel circuits PXC11 to PXC18 which respectively correspond to the pixels PX1 to PX4 of the first pixel row R1 may be arranged in the first direction DR1. On the first pixel row R2, the pixel circuits PXC21 to PXC28 which respectively correspond to the pixels PX1 to PX4 of the second pixel row R2 may be arranged in the first direction DR1. Likewise, on each of the third and fourth pixel rows R3 and R4, the pixel circuits PXC31 to PXC38 and PXC41 to PXC48, which respectively correspond to the pixels PX1 to PX4 of the third and fourth pixel rows R3 and R4, may be arranged in the first direction DR1.

In FIG. 3, the first, second, third, and fourth pixel circuits PXC11, PXC12, PXC13, and PXC14 of the first pixel row R1 may be included in one pixel unit PU, and the fifth, sixth, seventh, and eighth pixel circuits PXC15, PXC16, PXC17, and PXC18 of the first pixel row R1 may be included in another pixel unit PU.

Likewise, the first to fourth pixel circuits PXC21 to PXC24 of the second pixel row R2, the fifth to eighth pixel circuits PXC25 to PXC28 of the second pixel row R2, the first to fourth pixel circuits PXC31 to PXC34 of the third pixel row R3, the fifth to eighth pixel circuits PXC35 to PXC38 of the third pixel row R3, the first to fourth pixel circuits PXC41 to PXC44 of the fourth pixel row R4, and the fifth to eighth pixel circuits PXC45 to PXC48 of the fourth pixel row R4 may also be included in respective different pixel units PU.

In an embodiment, each of the pixel rows R1 to R4 may include light receiving elements LRD1 to LRD4. As will be discussed in greater detail, the sensor circuits of the light receiving elements LRD1 to LRD4 and the pixel circuits may be share one or more scan lines. For example, the sensor circuit of each light receiving element may share a scan line with an adjacent pixel circuit. In FIG. 3, it can be understood that each of the light receiving elements LRD1 to LRD4 is a light receiving area corresponding to the light receiving layer. However, this is only for convenience of explanation, and the positions, surface areas, shapes, or the like of the light receiving elements LRD1 to LRD4 are not limited thereto.

The light receiving elements LRD1 and LRD2 of the first pixel row R1 each may overlap at least some of the pixel circuits PXC11 to PXC14 of the first pixel row R1 and the sensor circuits SC11 and SC12 of the first pixel row R1. The light receiving elements LRD3 and LRD4 of the second pixel row R2 each may overlap at least some of the pixel circuits PXC21 to PXC24 of the second pixel row R2 and the sensor circuits SC21 and SC22 of the second pixel row R2.

In an embodiment, the first light receiving element LRD1 may overlap at least a portion of the first sensor circuit SC11 of the first pixel row R1. The third light receiving element LRD3 may overlap at least a portion of the first sensor circuit SC21 of the second pixel row R2.

Furthermore, referring to FIGS. 2 and 3, the second light receiving element LRD2 may overlap at least a portion of the second sensor circuit SC12 of the first pixel row R1. The fourth light receiving element LRD4 may overlap at least a portion of the second sensor circuit SC22 of the second pixel row R2. The light receiving elements LRD1 to LRD4 may be formed in the display area AA in an arrangement as shown, for example, in FIG. 4.

In an embodiment, the sensor circuits SC11 to SC44 may be connected to corresponding light receiving elements. For example, the first sensor circuit SC11 of the first pixel row R1 may be connected to the first light receiving element LRD1. The first sensor circuit SC11 and the first light receiving element LRD1 may form one photo sensor PHS. Likewise, the second sensor circuit SC12 of the first pixel row R1 may be connected to the second light receiving element LRD2. The first sensor circuit SC21 of the second pixel row R2 may be connected to the third light receiving element LRD3. The second sensor circuit SC22 of the second pixel row R2 may be connected to the fourth light receiving element LRD4. However, the present disclosure is not limited to the foregoing. For example, only some of the sensor circuits SC11 to SC44 may be provided and connected to a plurality of light receiving elements.

The first sensor circuit SC11 of the first pixel row R1 may be disposed between the first sub-pixel unit SPU1 and the second sub-pixel unit SPU2 included in the pixel unit PU. For example, the first and second pixel circuits PXC11 and PXC12 of the first pixel row R1 may be included in the first sub-pixel unit SPU1. The third and fourth pixel circuits PXC13 and PXC14 of the first pixel row R1 may be included in the second sub-pixel unit SPU2. Therefore, at least two pixel circuits (e.g., PXC13 and PXC14) may be disposed between the first sensor circuit SC11 and the second sensor circuit SC12 that are adjacent to each other on the first pixel row R1.

The second sensor circuit SC12 of the first pixel row R1, the first sensor circuit SC21 of the second pixel row R2, and the second sensor circuit SC22 of the second pixel row R2 may be disposed between the first sub-pixel unit SPU1 and the second sub-pixel unit SPU2 in a manner similar to that of the first sensor circuit SC11 of the first pixel row R1.

Figure 5:
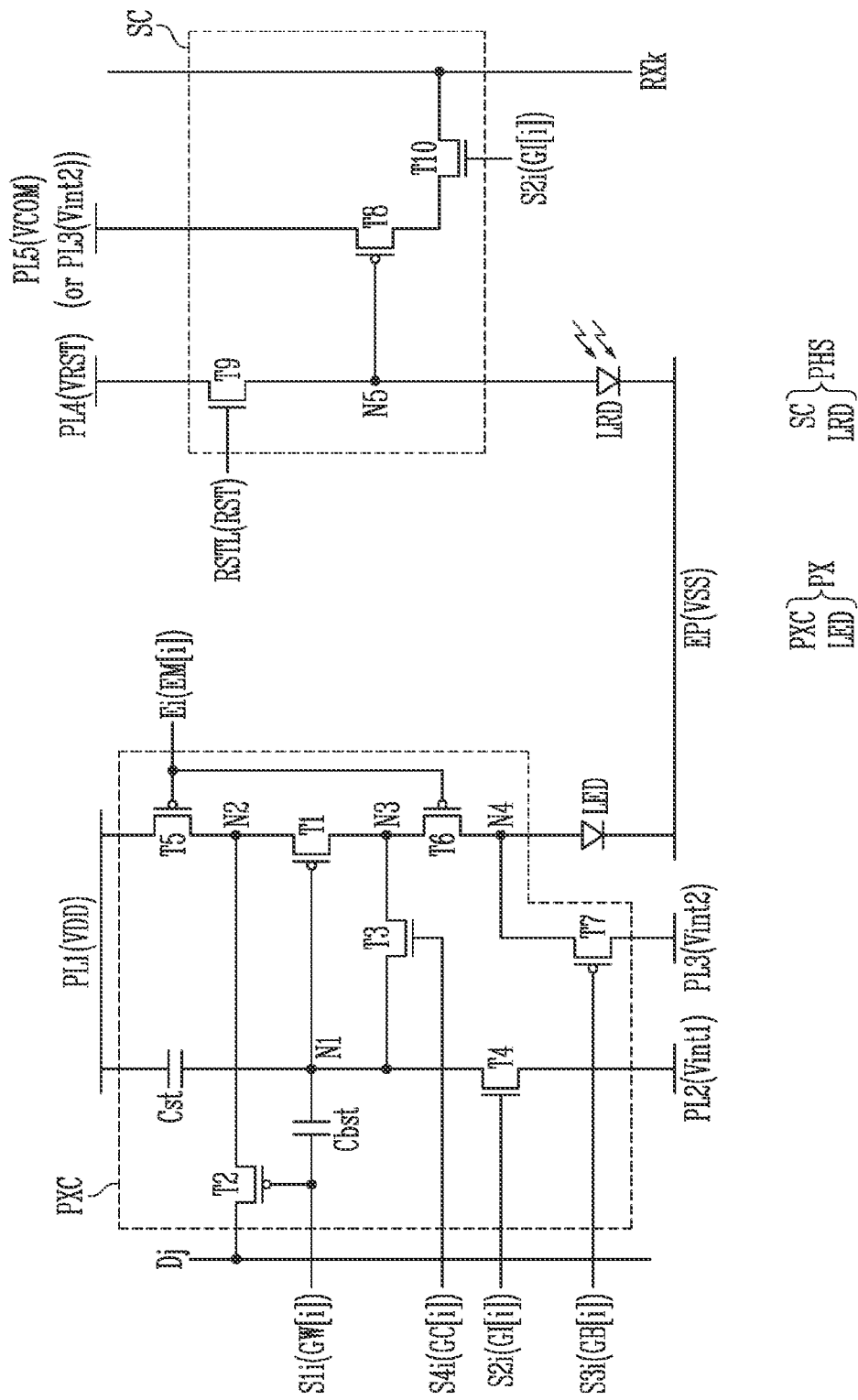
FIG. 5 is a circuit diagram illustrating an example embodiment of a pixel and a photo sensor which are included in the display area of FIG. 4.

FIG. 5 is a circuit diagram illustrating an example embodiment of a pixel PX and a photo sensor PHS which are included in the display area of FIG. 4. For convenience of description, FIG. 5 illustrates that the pixel PX is located on the i-th horizontal line (or the i-th pixel row) and connected to the j-th data line Dj. In an embodiment, i-th scan lines S1$i$ to S4$i$ may be included in the scan lines S1 to Sn or the i-th scan line Si of FIG. 2.

Referring to FIGS. 1 to 5, the pixel PX and the photo sensor PHS may be disposed on the i-th horizontal line. The pixel PX may include a light emitting element LED and a pixel circuit PXC. In an embodiment, the pixel circuit PXC may include first, second, third, fourth, fifth, sixth, and seventh transistors T1, T2, T3, T4, T5, T6, and T7, a storage capacitor Cst, and a boost capacitor Cbst.

The first transistor T1 (or a driving transistor) may be connected between a first power line PL1 and a first electrode of the light emitting element LED. The first transistor T1 may include a gate electrode connected to a first node N1. The first transistor T1 may control, in response to the voltage of the first node N1, the amount of current (driving current) flowing from the first power line PL1 to an electrode EP (or a power line) via the light emitting element LED. A first power voltage VDD may be provided to the first power line PL1. A second power voltage VSS may be provided to the electrode EP. The first power voltage VDD may be set to a voltage higher than the second power voltage VSS. For example, the first power voltage VDD may be approximately 4.6 V, and the second power voltage VSS may be approximately 2.6 V, but different voltages may be used in another embodiment.

The second transistor T2 may be connected between the j-th data line Dj and a second node N2. A gate electrode of the second transistor T2 may be connected to the 1i-th scan line S1$i$ (or the first scan line). When a first scan signal GW[i] (e.g., a first scan signal of a low level in a PMOS implementation) is supplied to the 1i-th scan line S1$i$, the second transistor T2 may be turned on to electrically connect the j-th data line Dj to the second node N2. In the case where each of the first transistor T1 and the third transistor T3 is turned on, the second transistor T2 may transmit a data signal of the j-th data line Dj to the first node N1 in response to the first scan signal GW[i].

The third transistor T3 may be (considered as a compensation transistor and is) connected between the first node N1 and the third node N3. A gate electrode of the third transistor T3 may be connected to the 4i-th scan line S4$i$ (or the third scan line). The third transistor T3 may be turned on when a fourth scan signal GC[i] is supplied to the 4i-th scan line S4$i$. If the third transistor T3 is turned on, the first transistor T1 may have a diode-connected form.

The fourth transistor T4 (an initialization transistor) may be connected between the first node N1 and the second power line PL2. A gate electrode of the fourth transistor T4 may be connected to the 2i-th scan line S2$i$ (or the second scan line). A first initialization power voltage Vint1 may be provided to the second power line PL2. For example, the first initialization power voltage Vint1 may be approximately −3.8 V. The fourth transistor T4 may be turned on by a second scan signal GI[i] supplied to the 2i-th scan line S2$i$. If the fourth transistor T4 is turned on, the first initialization power voltage Vint1 may be supplied to the first node N1 (i.e., the gate electrode of the first transistor T1 to initialize node N1).

The fifth transistor T5 (first emission transistor) may be connected between the first power line PL1 and the second node N2. A gate electrode of the fifth transistor T5 may be coupled to an i-th emission control line Ei. The sixth transistor T6 (second emission transistor) may be connected between the third node N3 and the light emitting element LED (or a fourth node N4). A gate electrode of the sixth transistor T6 may be connected to the i-th emission control line Ei. The fifth transistor T5 and the sixth transistor T6 may be turned off when an emission control signal EM[i] (e.g., an emission control signal EM[i] of a high level when implemented in PMOS) is supplied to the i-th emission control line Ei, and may be turned on in the other cases.

The seventh transistor T7 may be connected between the first electrode (i.e., the fourth node N4) of the light emitting element LED and a third power line PL3. A gate electrode of the seventh transistor T7 may be coupled to the 3i-th scan line S3$i$. A second initialization power voltage Vint2 may be provided to the third power line PL3. For example, the second initialization power voltage Vint2 may be approximately −3.8 V. In an embodiment, the second initialization power voltage Vint2 may differ from the first initialization power voltage Vint1. The seventh transistor T7 may be turned on by a third scan signal GB[i] supplied to the 3i-th scan line S3$i$, so that the second initialization power voltage Vint2 may be supplied to initialize the first electrode of the light emitting element LED.

The storage capacitor Cst may be connected or formed between the first power line PL1 and the first node N1. The storage capacitor Cst may store a voltage which corresponds to the light to be emitted by the light emitting element LED.

The boost capacitor Cbst (or a capacitor) may be connected or formed between the gate electrode of the second transistor T2 and the gate electrode of the first transistor T1. The embodiment of FIG. 5 is shown to have seven transistors and two capacitors. The number of transistors and/or the number of capacitors may be different in another embodiment.

The photo sensor PHS may include a sensor circuit SC and a light receiving element LRD. The sensor circuit SC may include three transistors, namely eighth, ninth, and tenth transistors T8, T9, and T10. The eighth and tenth transistors T8 and T10 may be connected between a fifth power line PL5 and a k-th readout line RXk (where k is a natural number). The number of transistors in the sensor circuit SC may be different in another embodiment.

The eighth transistor T8 (or a first sensor transistor) may be connected between the fifth power line PL5 and the tenth transistor T10. A gate electrode of the eighth transistor T8 may be connected to a fifth node N5 (or a sensor node). The eighth transistor T8 may control current flowing from the fifth power line PL5 to the k-th readout line RXk through the tenth transistor T10 in response to a voltage of the fifth node N5. A common voltage VCOM may be provided to the fifth power line PL5. For example, the common voltage VCOM may be approximately −3.8 V.

In an embodiment, the fifth power line PL5 may be electrically connected to or integrally formed with the third power line PL3. The common voltage VCOM applied to the fifth power line PL5 may be the same as the second initialization power voltage Vint2, but may be different in another embodiment. For example, the fifth power line PL5 may be electrically connected to or integrally formed with the second power line PL2. The common voltage VCOM applied to the fifth power line PL5 may be the same as the first initialization power voltage Vint1.

The tenth transistor T10 (or a second sensor transistor, or a switching transistor) may be connected between the eighth transistor T8 and the k-th readout line RXk. A gate electrode of the tenth transistor T10 may be connected to the 2i-th scan line S2$i$. Thus, according to one or more embodiments, the gate electrode of the tenth transistor T10 and the gate electrode of the fourth transistor T4 may be coupled to the 2i-th scan line S2$i$. In this way, the sensor circuit and an adjacent pixel may share the 2i-th scan line S2$i$. As will be discussed, sharing this scan line may allow the sensor circuit and pixel circuit to operate (e.g., be scanned) simultaneously.

The ninth transistor T9 (or a third sensor transistor) may be connected between a fourth power line PL4 (or a reference power line) and the fifth node N5. A gate electrode of the ninth transistor T9 may be connected to the reset control line RSTL. A reset voltage VRST may be provided to the fourth power line PL4. For example, the reset voltage VRST may be approximately −7 V.

At least one light receiving element LRD may be connected between the fifth node N5 and the electrode EP to which the second power voltage VSS is to be provided. The light receiving element LRD may generate charge (or current) based on incident light, e.g., the light receiving element LRD may perform the function of photoelectric transformation. For example, the light receiving element LRD may be implemented as a photo diode.

When the ninth transistor T9 is turned on in response to a reset signal RST supplied to the reset control line RSTL, the reset voltage VRST may be provided to the fifth node N5. For example, the voltage of the fifth node N5 may be reset by the reset voltage VRST. After the reset voltage VRST has been applied to the fifth node N5, the light receiving element LRD may perform a function of photoelectric transformation.

The voltage of the fifth node N5 may be changed by operation of the light receiving element LRD. The voltage of the fifth node N5 (or the charge or current generated from the light receiving element LRD) may be changed depending on the intensity of light that is incident on the light receiving element LRD or the time during which light is incident (or the time during which the light receiving element LRD is exposed).

When the tenth transistor T10 is turned on by the second scan signal GI[i] supplied to the 2i-th scan line S2$i$, a detection value (current and/or voltage) generated based on the voltage of the fifth node N5 may flow to the k-th readout line RXk. The detection value may be combined with the detection value output from other sensor circuits to be used in biometric authentication, e.g., fingerprint identification.

In an embodiment, each of the pixel circuit PXC and the sensor circuit SC may include a P-type transistor and an N-type transistor. In an embodiment, each of the third transistor T3, the fourth transistor T4, the ninth transistor T9, and the tenth transistor T10 may be formed of a single-gate transistor such as an oxide semiconductor transistor including an oxide semiconductor (or a second type semiconductor). For example, each of the third transistor T3, the fourth transistor T4, the ninth transistor T9, and the tenth transistor T10 may be formed of an N-type oxide semiconductor transistor, and may include an oxide semiconductor layer as an active layer.

The oxide semiconductor transistor may be produced through a low-temperature process, and have low charge mobility compared to that of the poly-silicon semiconductor transistor. For example, the oxide semiconductor transistor may have excellent off-current characteristics. Therefore, generation of leakage current on the third transistor T3, the fourth transistor T4, the ninth transistor T9, and tenth transistor T10 may be reduced or minimized.

The other transistors (e.g., the first, second, fifth, sixth, seventh, and eighth transistors T1, T2, T5, T6, T7, and T8) may be formed of a poly-silicon transistor including a silicon semiconductor (or a first type semiconductor), and may include a poly-silicon semiconductor layer as an active layer. For example, the active layer may be formed through a low-temperature poly-silicon (LTPS) process. For example, the poly-silicon transistor may be a P-type poly-silicon transistor. Because a poly-silicon semiconductor transistor has an advantage of a high response speed, the poly-silicon semiconductor transistor may be applied to a switching element in which a high-speed switching operation is to be performed.

As described above, the pixel circuit PXC and the sensor circuit SC may share a scan line (e.g., the 2i-th scan line S2$i$), so that the pixel circuit PXC and the sensor circuit SC may be simultaneously scanned. In this case, the number of lines disposed on the display panel 100 (refer to FIG. 1) is relatively reduced, and a reduction in resolution due to the lines (e.g., a relatively large number of lines) can be prevented. Furthermore, a driver (e.g., the scan driver 211) for driving the pixel PX and the photo sensor PHS may have an integrated structure, so that space for the driver can be reduced. Furthermore, because the tenth transistor T10 is implemented as an oxide semiconductor transistor (different from the type of transistors used in one or more of eighth transistor T8 or ninth transistor T9), current leaking through the k-th readout line RXk may be reduced or minimized. Therefore, the sensing sensitivity of the photo sensor PHS including the sensor circuit SC may be enhanced.

Figure 6:
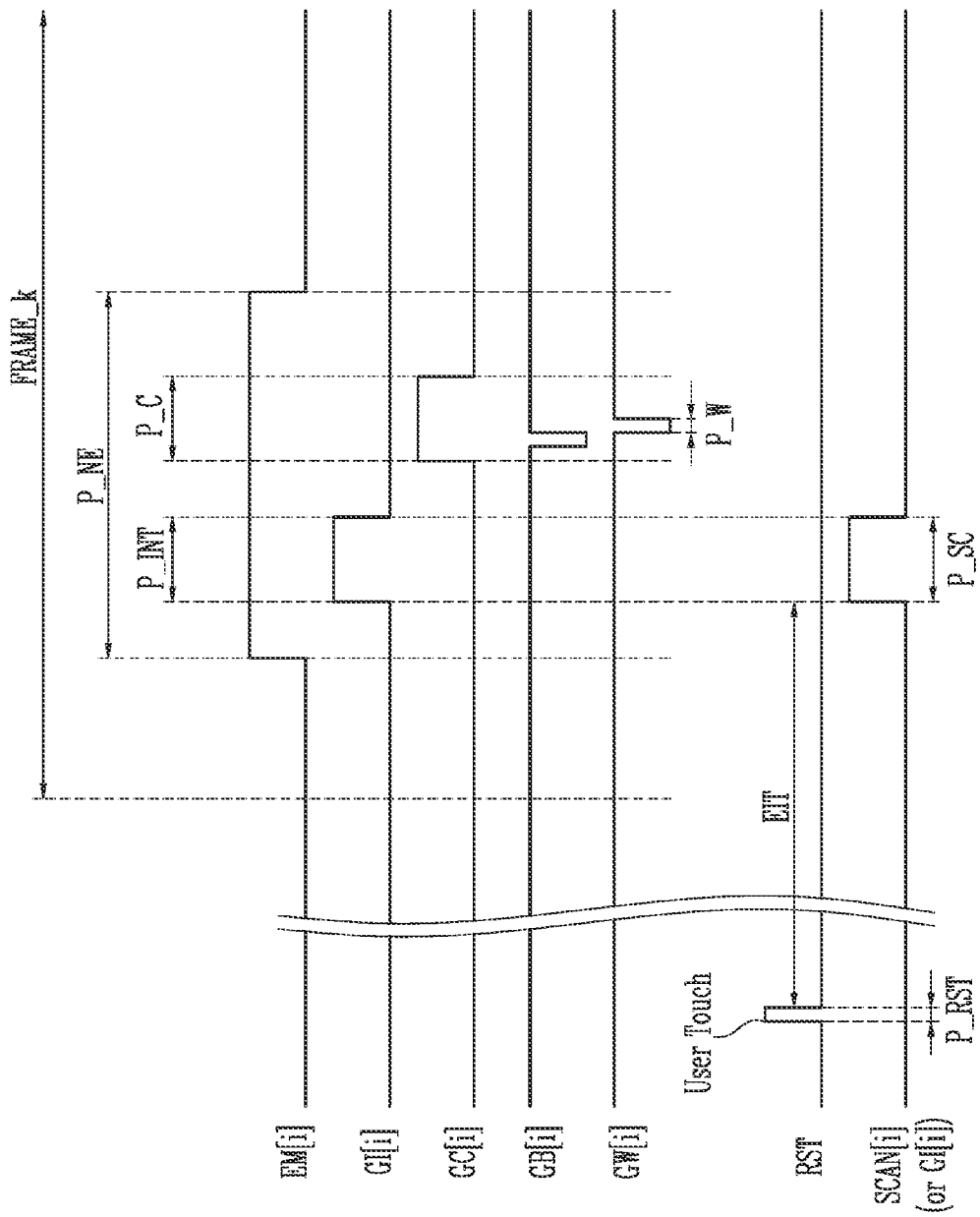
FIG. 6 is a waveform diagram for describing an embodiment of the operation of the pixel and the photo sensor of FIG. 5.

FIG. 6 is a waveform diagram for describing an embodiment of the operation of the pixel PX and the photo sensor PHS of FIG. 5.

Referring to FIGS. 1, 2, 5, and 6, the emission control signal EM[i] may be provided to the i-th emission control line Ei, the second scan signal GI[i] may be provided to the 2i-th scan line S2$i$, the fourth scan signal GC[i] may be provided to the 4i-th scan line S4$i$, the third scan signal GB[i] may be provided to the 3i-th scan line S3$i$, and the first scan signal GW[i] may be provided to the 1i-th scan line S1$i$. The reset signal RST may be provided to the reset control line RSTL. The sensing scan signal SCAN[i](or the i-th sensing scan signal) may refer to a signal which is provided to the gate electrode of the tenth transistor T10. Because the gate electrode of the tenth transistor T10 is connected to the 2i-th scan line S2i, the sensing scan signal SCAN[i] may be the second scan signal GI[i].

A k-th frame period FRAME_k may include a non-emission period P_NE. The non-emission period P_NE (or the k-th frame period FRAME_k) may include three periods: an initialization period P_INT, a compensation period P_C, and a write period P_W. The write period P_W may be included in the compensation period P_C. For example, the write period P_W may include one horizontal time, each of the initialization period P_INT and the compensation period P_C may include six horizontal times, and the non-emission period P_NE may include twenty-six horizontal times, but the present disclosure is not limited thereto.

In the non-emission period P_NE, the emission control signal EM[i] may have a predetermined (e.g., high) level. In this case, in response to the emission control signal EM[i] having a high level, the fifth transistor T5 and the sixth transistor T6 may be turned off, and the pixel PX may not emit light.

In the initialization period P_INT, the second scan signal GI[i]may have a predetermined (e.g., high) level. In this case, in response to the second scan signal GI[i] having a high level, the fourth transistor T4 may be turned on, and the first initialization power voltage Vint1 of the second power line PL2 may be provided to the first node N1 (or the gate electrode of the first transistor T1).

Thereafter, during the compensation period P_C, the fourth scan signal GC[i] may have a predetermined (e.g., high) level. In response to the fourth scan signal GC[i] having a high level, the third transistor T3 may be turned on, and the first transistor T1 may be diode-connected.

In the write period P_W, the first scan signal GW[i] may have a low level. In this case, in response to the first scan signal GW[i] having a low level, the second transistor T2 may be turned on, and a data signal may be provided from the j-th data line Dj to the second node N2. Furthermore, because the third transistor T3 remains turned on in response to the fourth scan signal GC[i] having a high level, the data signal may be transmitted from the second node N2 to the first node N1 through the first transistor T1 and the third transistor T3. Because the first transistor T1 remains in a diode-connected form by the turned-on third transistor T3, the voltage of the first node N1 may have a voltage obtained by compensating the data signal for a threshold voltage of the first transistor T1.

Before the write period P_W, the third scan signal GB[i] may have a low level. In this case, the seventh transistor T7 may be turned on in response to the third scan signal GB[i], and the second initialization power voltage Vint2 may be supplied to the first electrode of the light emitting element LED. The third scan signal GB[i] may be a first scan signal (e.g., GW[i−1]) provided to a previous row, but the present disclosure is not limited thereto.

Subsequently, the non-emission period P_NE may be terminated, and the emission control signal EM[i] may have a low level. In this case, in response to the emission control signal EM[i] having a low level, the fifth transistor T5 and the sixth transistor T6 may be turned on, and a current transfer path may be formed from the first power line PL1 to the electrode EP through the fifth transistor T5, the first transistor T1, the sixth transistor T6, and the light emitting element LED. Furthermore, driving current corresponding to a voltage (e.g., a data signal) of the first node N1 may flow through the light emitting element LED by operation of the first transistor T1, so that the light emitting element LED may emit light having a luminance corresponding to the driving current.

In a reset period P_RST before the k-th frame period FRAME_k, the reset signal RST may have a high level. In the case where touch input from the user or a fingerprint sensing request is generated, the reset circuit 221 (e.g., refer to FIG. 2) may provide the reset signal RST having a high level to the reset control line RSTL. In response to the reset signal RST having a high level, the ninth transistor T9 may be turned on, and the reset voltage VRST may be applied to the fifth node N5. The voltage of the fifth node N5 may be reset by the reset voltage VRST.

Thereafter, the ninth transistor T9 may be turned off in response to the reset signal RST having a low level. In the case where light is incident on the light receiving element LRD during an exposure time EIT, the voltage of the fifth node N5 may be changed by the photoelectric transformation function of the light receiving element LRD.

In a sensing scan period P_SC of the k-th frame period FRAME_k, the sensing scan signal SCAN[i], e.g., the second scan signal GI[i], may have a low level. The sensing scan period P_SC may be the same (in duration) as the initialization period P_INT. In response to the second scan signal GI[i], the tenth transistor T10 may be turned on, so that the current (or a detected value) may flow from the fifth power line PL5 to the k-th readout line RXk in response to the voltage of the fifth node N5.

For example, in the case where a touch from the user is input to the display panel 100, current (e.g., a detected value) corresponding to light reflected by the user (e.g., the finger of the user) may be output in the k-th frame period FRAME_k. For example, the fingerprint of the user may be sensed based on the detected value.

Figure 7B:
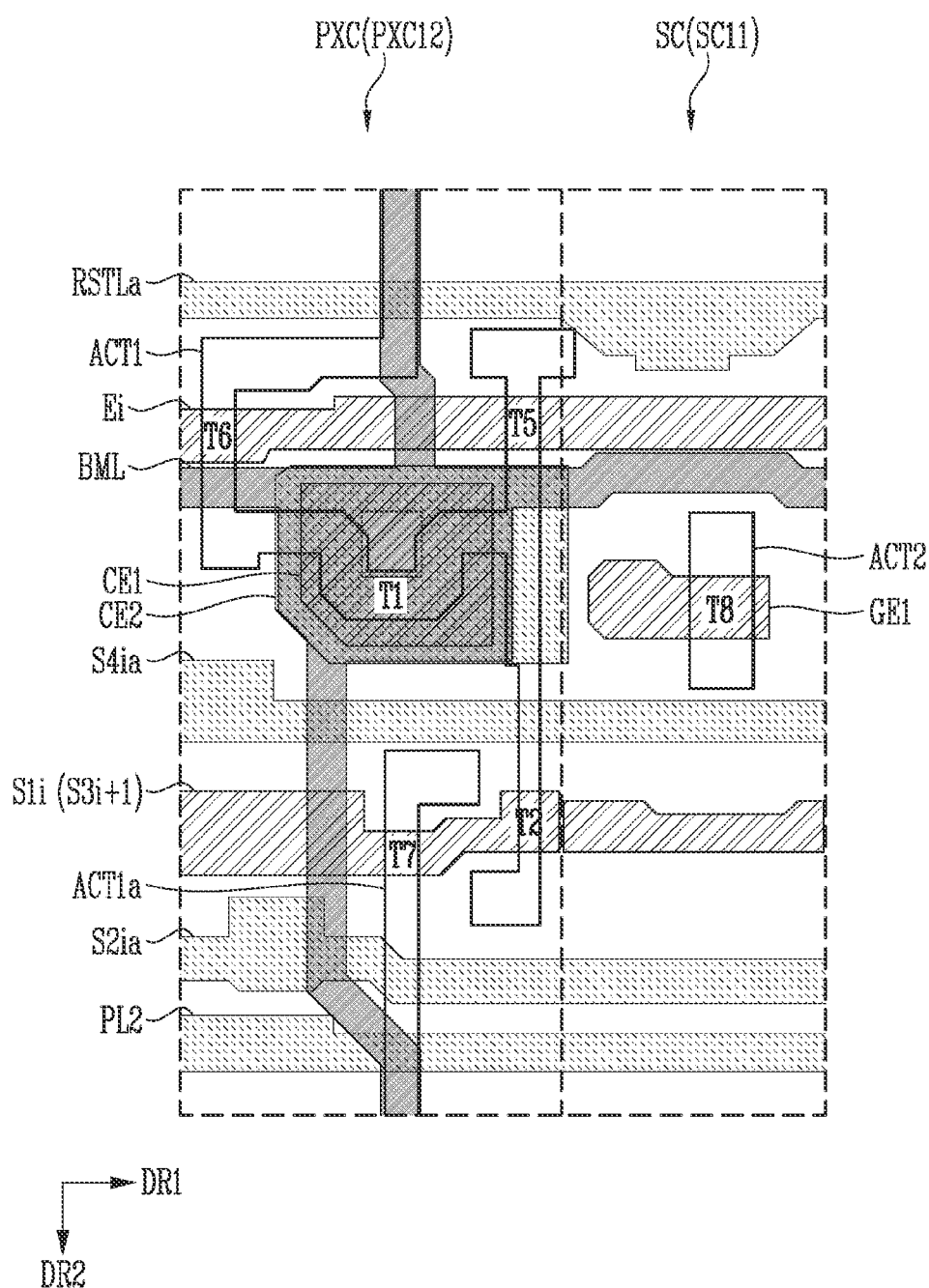
Figure 7C:
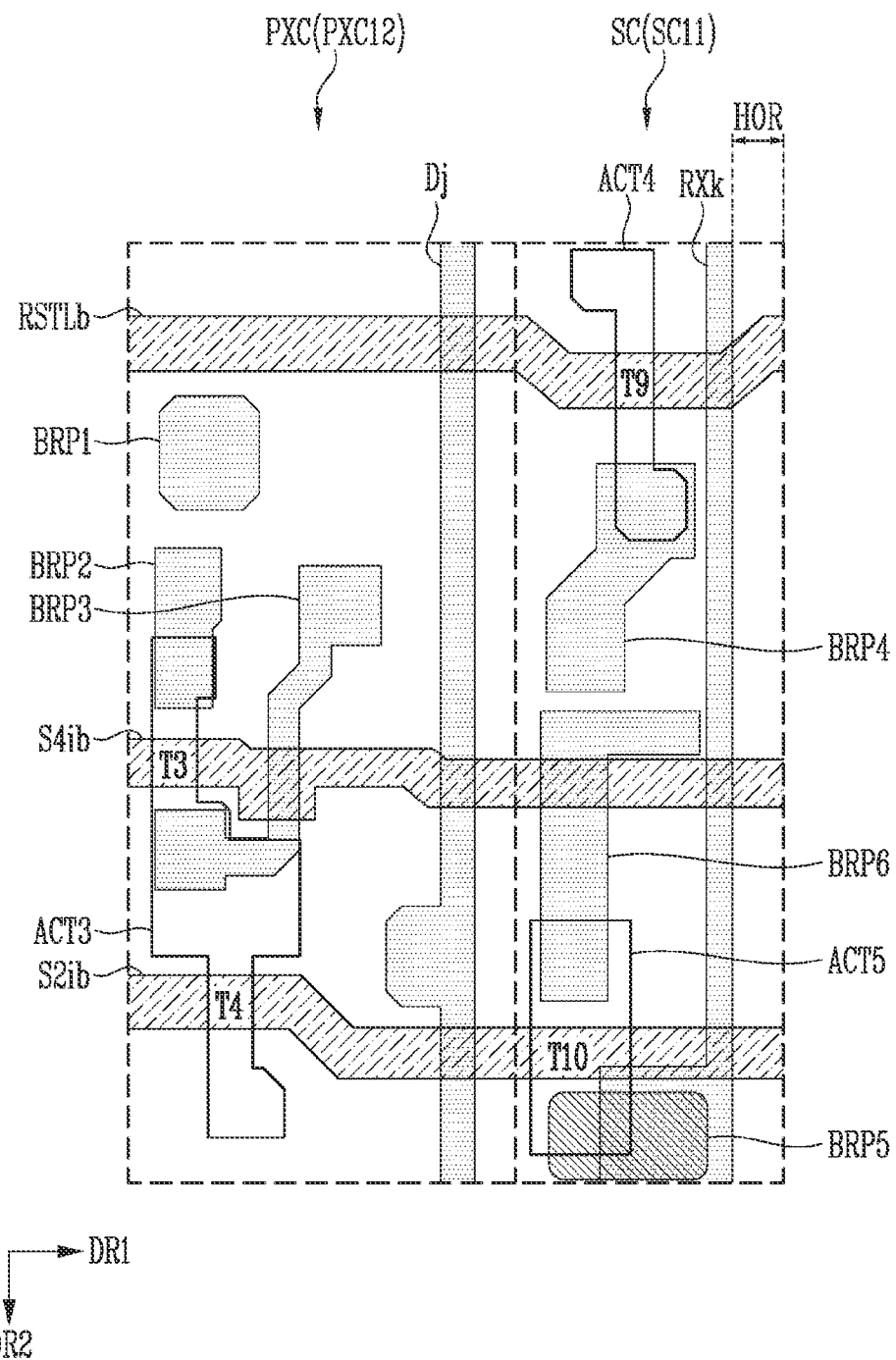
Figure 8:
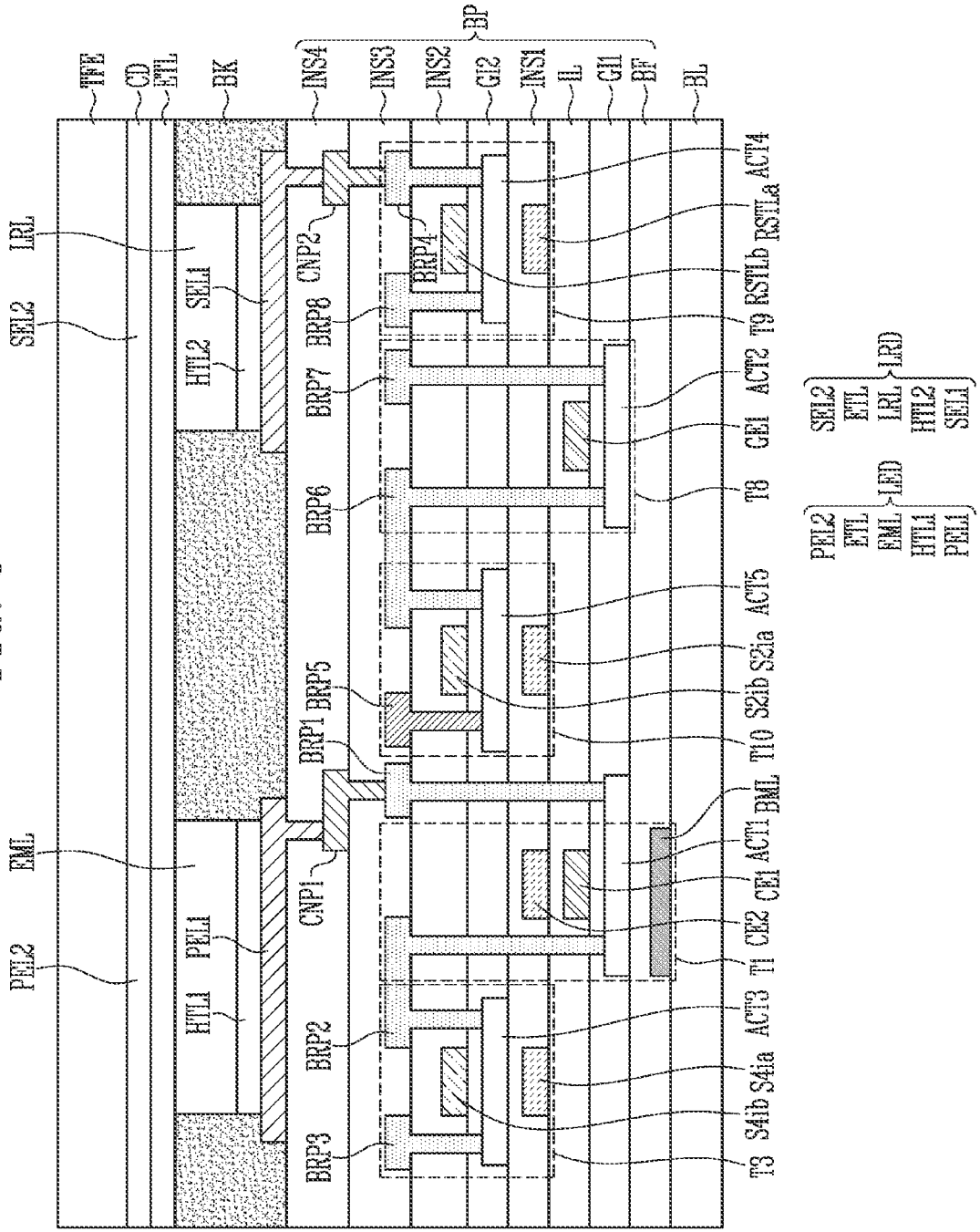
FIG. 8 is a sectional view illustrating an embodiment of the display area of FIG. 4.

FIGS. 7A, 7B, and 7C are plan views illustrating an embodiment of the display area of FIG. 4. FIGS. 7A, 7B, and 7C illustrate the pixel circuit PXC and the sensor circuit SC of FIG. 5. Based on a first insulating layer INS1 of FIG. 8, some lower components of the pixel circuit PXC (and the sensor circuit SC) are illustrated in FIG. 7B, and some upper components of the pixel circuit PXC (and the sensor circuit SC) are illustrated in FIG. 7C. FIG. 8 is a sectional view illustrating an embodiment of the display area of FIG. 4.

Although FIGS. 7A to 8 simply illustrate a sub-pixel, e.g., illustrating that each electrode is formed of a single electrode and each insulating layer is formed of a single insulating layer, the present disclosure is not limited thereto. In the description of embodiments of the present disclosure, "components are provided and/or formed on the same layer" may include the case where the components are formed through the same process, and "components are provided and/or formed on different layers may include the case where that the components are formed through different processes.

In FIGS. 7A, 7B, and 7C, a transverse direction (or a horizontal direction) in a plan view is indicated as a first direction DR1, and a longitudinal direction (or a vertical direction) in a plan view is indicated as a second direction DR2.

Referring to FIGS. 4, 5, and 7A to 8, the sensor circuit SC may correspond to the first sensor circuit SC11 of FIG. 4, and a left pixel circuit PXC and a right pixel circuit PXC with respect to the sensor circuit SC may respectively correspond to a twelfth pixel circuit PXC12 and a thirteenth pixel circuit PXC13. The left pixel circuit PXC and the right pixel circuit PXC based on the sensor circuit SC may be symmetric to each other with respect to the sensor circuit SC, and may be substantially the same as each other. Hence, the following description will be made based on the left pixel circuit PXC (e.g., twelfth pixel circuit PXC12), and redundant explanations will be omitted. For convenience of explanation, FIGS. 7B and 7C illustrate only the left pixel circuit PXC (e.g., twelfth pixel circuit PXC12) and the sensor circuit SC.

Hereinafter, components will be described in the order in which the components are stacked on a base layer BL. The base layer BL (or a substrate) may be made of insulating material such as glass or resin. Furthermore, the base layer BL may be made of material having flexibility so as to be bendable, rollable, or foldable, and may have a single layer or multilayer structure.

The backplane structure BP including the pixel circuit PXC and the sensor circuit SC may be provided on the base layer BL. The backplane structure BP may include a semiconductor layer, a plurality of conductive layers, and a plurality of insulating layers.

A bottom electrode BML (or a first power line) may be disposed on the base layer BL. The bottom electrode BML may overlap the first transistor T1 (or a first capacitor electrode CE1 and a second capacitor electrode CE2), in a plan view. The bottom electrode BML may shield the first transistor T1 (or the first capacitor CE1 and the second capacitor electrode CE2) from the bottom. A constant voltage (e.g., the first power voltage VDD) may be applied to the bottom electrode BML. The bottom electrode BML may extend in the first direction DR1 and the second direction DR2 based on the first transistor T1. The bottom electrode BML may have a mesh structure over the entirety of the display area.

The bottom electrode BML may include conductive material. For example, the conductive material may include copper (Cu), molybdenum (Mo), tungsten (W), aluminum-neodymium (AlNd), titanium (Ti), aluminum (Al), silver (Ag), or an alloy thereof.

The buffer layer BF may be provided on the base layer BL to cover the bottom electrode BML. The buffer layer BFL may be an inorganic insulating layer including inorganic material. For example, the inorganic material may include at least one of silicon nitride ($SiN_x$), silicon oxide ($SiO_x$), silicon oxynitride ($SiO_xN_y$), or metal oxide such as aluminum oxide ($AlO_x$). Although the buffer layer BF may be provided in a single-layer structure, the buffer layer BFL may be provided in a multi-layer structure having at least two or more layers in another embodiment. The buffer layer BF may prevent impurities from being diffused into transistors (e.g., the first to tenth transistors T1 to T10).

A first semiconductor pattern ACT1 (or a first active pattern, or a first semiconductor layer) of the pixel circuit PXC, and a second semiconductor pattern ACT2 (or a second active pattern, or a second semiconductor layer) of the sensor circuit SC may be disposed on the buffer layer BF. Each of the first semiconductor pattern ACT1 and the second semiconductor pattern ACT2 may be formed, for example, of a poly-silicon semiconductor.

The first semiconductor pattern ACT1 that overlaps the first capacitor electrode CE1 may form a channel area of the first transistor T1. The first semiconductor pattern ACT1 may extend from opposite ends of the channel area of the first transistor T1 in a direction opposite to the second direction DR2. The first semiconductor pattern ACT1 that overlaps the i-th emission control line Ei may form a channel area of the fifth transistor T5 and a channel area of the sixth transistor T6. The first semiconductor pattern ACT1 may extend from the channel area of the sixth transistor T6 in a direction opposite to the second direction DR2. The first semiconductor pattern ACT1 that overlaps the 1i-th scan line S1$i$ (or a 1a-th semiconductor pattern ACT1$a$ that overlaps a 3i+1-th scan line S3$i$+1 of FIG. 7B) may form a channel area of the seventh transistor T7. The first semiconductor pattern ACT1 may extend from a right end of the channel area of the first transistor T1 in the second direction DR2. The first semiconductor pattern ACT1 that overlaps the 1i-th scan line S1$i$ may form a channel area of the second transistor T2.

For example, the channel area may be a semiconductor pattern undoped with impurities and, for example, may be an intrinsic semiconductor. Except for the channel area, the remaining area of the semiconductor panel (e.g., the remaining area of the first semiconductor pattern ACT1) may be a semiconductor pattern doped with an impurity.

The second semiconductor pattern ACT2 may be spaced apart from the first semiconductor pattern ACT1 in the first direction DR1 and may extend in the second direction DR2. The second semiconductor pattern ACT2 that overlaps a first gate electrode GE1 may form a channel area of the eighth transistor T8.

A first gate insulating layer GI1 may be provided on the first semiconductor pattern ACT1 and the second semiconductor pattern ACT2. The first gate insulating layer GI1 may be an insulating layer formed of inorganic material.

The first capacitor electrode CE1, the first gate electrode GE1, the i-th emission control line Ei, and the 1i-th scan line S1$i$ (and the 3i+1-th scan line S3$i$+1 of FIG. 7B) may be disposed on the first gate insulating layer GI1. Each of the first capacitor electrode CE1, the first gate electrode GE1, the i-th emission control line Ei, and the 1i-th scan line S1$i$ may include conductive material.

The first capacitor electrode CE1, that overlaps the first semiconductor pattern ACT1, may form the gate electrode of the first transistor T1.

The first gate electrode GE1 that overlaps the first semiconductor pattern ACT1 may form the gate electrode of the eighth transistor T8.

In a plan view, the i-th emission control line Ei and the 1i-th scan line S1$i$ may be spaced apart from each other, with the first capacitor electrode CE1 interposed therebetween. Each of the i-th emission control line Ei and the 1i-th scan line S1$i$ may extend in the first direction DR1.

The i-th emission control line Ei that overlaps the first semiconductor pattern ACT1 may form the gate electrode of the fifth transistor T5 and the gate electrode of the sixth transistor T6.

The 1i-th scan line S1$i$ that overlaps the first semiconductor pattern ACT1 may form the gate electrode of the second transistor T2. Furthermore, the 1i-th scan line S1$i$ (or the 3i+1-th scan line S3$i$+1 of FIG. 7B) that overlaps the first semiconductor pattern ACT1 may form the gate electrode of the seventh transistor T7.

An interlayer insulating layer IL may be disposed on the first capacitor electrode CE1, the first gate electrode GE1, the i-th emission control line Ei, and the 1i-th scan line S1$i$ (and the 3i+1-th scan line S3$i$+1 of FIG. 7B). The interlayer insulating layer IL may be an insulating layer formed of inorganic material.

The second capacitor electrode CE2, a first sub-reset control line RSTLa, a 2ia-th scan line S2$ia$ (or a first sub-scan line), and a 4ia-th scan line S4$ia$ (or a second sub-scan line) may be disposed on the interlayer insulating layer IL. The second capacitor electrode CE2, the first sub-reset control line RSTLa, the 2ia-th scan line S2$ia$, and the 4ia-th scan line S4$ia$ each may include conductive material. The first sub-reset control line RSTLa may form the reset control line RSTL along with a second sub-reset control line RSTLb. Likewise, the 2ia-th scan line S2*ia* may form the 2i-th scan line S2*i* along with a 2ib-th scan line S2*ib* (or a third sub-scan line). The 4ia-th scan line S4*ia* may form the 4i-th scan line S4*i* along with a 4ib-th scan line S4*ib* (or fourth sub-scan line).

The second capacitor electrode CE2 may overlap the first capacitor electrode CE1 to form the storage capacitor Cst. In one embodiment, most of the second capacitor electrode CE2 may overlap the first capacitor electrode CE1. The second capacitor electrode CE2 may include an opening through which the first capacitor electrode CE1 is exposed.

In a plan view, the first sub-reset control line RSTLa, the 2ia-th scan line S2*ia*, and the 4ia-th scan line S4*ia* may be spaced apart from each other in the second direction DR2. Each of the first sub-reset control line RSTLa, the 2ia-th scan line S2*ia*, and the 4ia-th scan line S4*ia* may extend in the first direction DR1.

The first insulating layer INS1 may be disposed on the second capacitor electrode CE2, the first sub-reset control line RSTLa, the 2ia-th scan line S2*ia*, and the 4ia-th scan line S4*ia*. The first insulating layer INS1 may be an insulating layer formed of inorganic material.

A third semiconductor pattern ACT3 (or a third active pattern, or a third semiconductor layer) of the pixel circuit PXC, and a fourth semiconductor pattern ACT4 (or a fourth active pattern, or a fourth semiconductor layer) and a fifth semiconductor pattern ACT5 (or a fifth active pattern, or a fifth semiconductor layer) of the sensor circuit SC may be disposed on the first insulating layer INS1. Each of the third semiconductor pattern ACT3, the fourth semiconductor pattern ACT4, and the fifth semiconductor pattern ACT5 may be formed of an oxide semiconductor. Each of the third semiconductor pattern ACT3, the fourth semiconductor pattern ACT4, and the fifth semiconductor pattern ACT5 may substantially extend in the second direction DR2. For example, the length of each of the third semiconductor pattern ACT3, the fourth semiconductor pattern ACT4, and the fifth semiconductor pattern ACT5 in the second direction DR2 may be greater than a width thereof in the first direction DR1.

In the case where each of the fifth semiconductor pattern ACT5, the fourth semiconductor pattern ACT4, and the second semiconductor pattern ACT2 extends only in the second direction DR2, the width of the sensor circuit SC in the first direction DR1 may be reduced. As described below with reference to FIG. 10, space for the sensor circuit SC may be decreased or reduced by horizontal space HOR in the first direction DR1, compared to comparative example of the sensor circuit SC_C of FIG. 10. Therefore, degradation in resolution of the display area AA of the display panel 100 of FIGS. 2 and 3 (e.g., resulting from the disposition of the sensor circuit SC) may be mitigated or minimized. Thus, a display device including the sensor circuit SC may be enhanced in resolution, compared to the display device including the sensor circuit SC_C of FIG. 10.

The third semiconductor pattern ACT3 that overlaps the 4ia-th scan line S4*ia* (and the 4ib-th scan line S4*ib*) may form a channel area of the third transistor T3. The third semiconductor pattern ACT3 that overlaps the 2ia-th scan line S2*ia* (and the 2ib-th scan line S2*ib*) may form a channel area of the fourth transistor T4.

The third semiconductor pattern ACT3 (e.g., an area doped with an impurity) may overlap the 1i-th scan line S1*i*. The third semiconductor pattern ACT3 and the 1i-th scan line S1*i* may form the boost capacitor Cbst.

The fourth semiconductor pattern ACT4 that overlaps the first sub-reset control line RSTLa may form a channel area of the ninth transistor T9.

The fifth semiconductor pattern ACT5 that overlaps the 2ia-th scan line S2*ia* (and the 2ib-th scan line S2*ib*) may form a channel area of the tenth transistor T10.

A second gate insulating layer GI2 may be disposed on the third semiconductor pattern ACT3, the fourth semiconductor pattern ACT4, and the fifth semiconductor pattern ACT5. The second gate insulating layer GI2 may be an insulating layer formed of inorganic material.

The second sub-reset control line RSTLb, the 2ib-th scan line S2*ib* (or the third sub-scan line), and the 4ib-th scan line S4*ib* (or the fourth sub scan line) may be disposed on the second gate insulating layer GI2. The 2ib-th scan line S2*ib* and the 4ib-th scan line S4*ib* each may include conductive material.

In a plan view, the second sub-reset control line RSTLb, the 2ib-th scan line S2*ib*, and the 4ib-th scan line S4*ib* may be spaced apart from each other in the second direction DR2. Each of the second sub-reset control line RSTLb, the 2ib-th scan line S2*ib*, and the 4ib-th scan line S4*ib* may extend in the first direction DR1.

The second sub-reset control line RSTLb may overlap the first sub-reset control line RSTLa. The second sub-reset control line RSTLb that overlaps the fourth semiconductor pattern ACT4 may form the gate electrode (or a first gate electrode) of the ninth transistor T9. The first sub-reset control line RSTLa that overlaps the fourth semiconductor pattern ACT4 may form a bottom gate electrode (or a second gate electrode) of the ninth transistor T9.

The 2ib-th scan line S2*ib* may overlap the 2ia-th scan line S2*ia*. The 2ib-th scan line S2*ib* that overlaps the third semiconductor pattern ACT3 may form the gate electrode (or a first gate electrode) of the fourth transistor T4. The 2ia-th scan line S2*ia* that overlaps the third semiconductor pattern ACT3 may form a bottom gate electrode (or a second gate electrode) of the fourth transistor T4.

The 2ib-th scan line S2*ib* that overlaps the fifth semiconductor pattern ACT5 may form the gate electrode (or a first gate electrode) of the tenth transistor T10. The 2ia-th scan line S2*ia* that overlaps the fifth semiconductor pattern ACT5 may form a bottom gate electrode (or a second gate electrode) of the tenth transistor T10.

The 4ib-th scan line S4*ib* may overlap the 4ia-th scan line S4*ia*. The 4ib-th scan line S4*ib* that overlaps the third semiconductor pattern ACT3 may form the gate electrode (or a first gate electrode) of the third transistor T3. The 4ia-th scan line S4*ia* that overlaps the third semiconductor pattern ACT3 may form a bottom gate electrode (or a second gate electrode) of the third transistor T3.

A second insulating layer INS2 may be disposed on the second sub-reset control line RSTLb, the 2ib-th scan line S2*ib*, and the 4ib-th scan line S4*ib*. The second insulating layer INS2 may be an insulating layer formed of inorganic material.

Bridge patterns BRP1 to BRP8 may be disposed on the second insulating layer INS2. The bridge patterns BRP1 to BRP8 may include conductive material.

The first bridge pattern BRP1 may overlap the first semiconductor pattern ACT1, and may be connected to the first semiconductor pattern ACT1 through a contact hole CNT (e.g., a contact hole passing through the second insulating layer INS2 or the like). The first bridge pattern BRP1 may be electrically connected to the light emitting element LED (e.g., refer to FIG. 8). The first bridge pattern BRP1 may form the fourth node N4 of FIG. 5.

The second bridge pattern BRP2 may overlap the first semiconductor pattern ACT1, and may be connected to the first semiconductor pattern ACT1 (or one electrode of the first transistor T1) through a contact hole. The second bridge pattern BRP2 may overlap the third semiconductor pattern ACT3, and may be connected to the third semiconductor pattern ACT3 (or one electrode of the third transistor T3) through a contact hole. The second bridge pattern BRP2 may electrically connect the first transistor T1 and the third transistor T3 to each other. The second bridge pattern BRP2 may form the third node N3 of FIG. 5.

The third bridge pattern BRP3 may overlap the first capacitor electrode CE1, and may be connected to the first capacitor electrode CE1 through a contact hole (and an opening of the second capacitor electrode CE2). Furthermore, the third bridge pattern BRP3 may overlap the third semiconductor pattern ACT3, and may be connected to the third semiconductor pattern ACT3 (or another electrode of the third transistor T3) through a contact hole. The third bridge pattern BRP3 may electrically connect the first capacitor electrode CE1 (or the storage capacitor Cst) and the third transistor T3 to each other. The third bridge pattern BRP3 may form the first node N1 of FIG. 5.

The fourth bridge pattern BRP4 may overlap the first gate electrode GE1, and may be connected to the first gate electrode GE1 (or the gate electrode of the eighth transistor T8) through a contact hole. The fourth bridge pattern BRP4 may overlap the fourth semiconductor pattern ACT4, and may be connected to the fourth semiconductor pattern ACT4 (or one electrode of the ninth transistor T9) through a contact hole. The fourth bridge pattern BRP4 may electrically connect the gate electrode of the eighth transistor T8 and the ninth transistor T9 to each other. The fourth bridge pattern BRP4 may form the fifth node N5 of FIG. 5.

The fifth bridge pattern BRP5 may overlap the fifth semiconductor pattern ACT5, and may be connected to the fifth semiconductor pattern ACT5 (or one electrode of the tenth transistor T10) through a contact hole. The fifth bridge pattern BRP5 may electrically connect the tenth transistor T10 and the k-th readout line RXk to each other.

The sixth bridge pattern BRP6 may overlap the second semiconductor pattern ACT2, and may be connected to the second semiconductor pattern ACT2 (or one electrode of the eighth transistor T8) through a contact hole. Furthermore, the sixth bridge pattern BRP6 may overlap the fifth semiconductor pattern ACT5, and may be connected to the fifth semiconductor pattern ACT5 (or another electrode of the tenth transistor T10) through a contact hole. The sixth bridge pattern BRP6 may electrically connect the eighth transistor T8 and the tenth transistor T10 to each other.

Referring to FIG. 8, the seventh bridge pattern BRP7 may overlap the second semiconductor pattern ACT2, and may be connected to the second semiconductor pattern ACT2 (or another electrode of the eighth transistor T8) through a contact hole. The seventh bridge pattern BRP7 may electrically connect the eighth transistor T8 and the fifth power line PL5 of FIG. 5 to each other. The eighth bridge pattern BRP8 may overlap the fourth semiconductor pattern ACT4, and may be connected to the fourth semiconductor pattern ACT4 (or another electrode of the ninth transistor T9) through a contact hole. The eighth bridge pattern BRP8 may electrically connect the ninth transistor T9 and the fourth power line PL4 of FIG. 5 to each other.

A third insulating layer INS3 may be disposed on the bridge patterns BRP1 and BRP8. The third insulating layer INS3 may be an insulating layer formed of inorganic material.

The j-th data line Dj and the k-th readout line RXk may be disposed on the third insulating layer INS3. Furthermore, a first connection pattern CNP1 and a second connection pattern CNP2 may be disposed on the third insulating layer INS3 (e.g., refer to FIG. 8). Each of the j-th data line Dj, the k-th readout line RXk, the first connection pattern CNP1, and the second connection pattern CNP2 may include conductive material.

Each of the j-th data line Dj and the k-th readout line RXk may extend in the second direction DR2. The j-th data line Dj may be connected to the first semiconductor pattern ACT1 (or one electrode of the second transistor T2) through a contact hole. The k-th readout line RXk (which carries a signal for fingerprint detection) may be connected to the fifth bridge pattern BRP5 through a contact hole.

Referring to FIG. 8, the first connection pattern CNP1 may be connected to the first bridge pattern BRP1 through a contact hole that passes through the third insulating layer INS3. The second connection pattern CNP2 may be connected to the eighth bridge pattern BRP8 through a contact hole.

A fourth insulating layer INS4 may be disposed on the j-th data line Dj, the k-th readout line RXk, the first connection pattern CNP1, and the second connection pattern CNP2. The fourth insulating layer INS4 may be formed of organic material and/or inorganic material. In an embodiment, the fourth insulating layer INS4 may function as a planarization layer.

A pixel layer including a first pixel electrode PEL1, a first sensor electrode SEL1, and a bank layer BK may be provided on the fourth insulating layer INS4.

The pixel layer may include a light emitting element LED connected to the pixel circuit PXC, and a light receiving element LRD connected to the sensor circuit SC.

In an embodiment, the light emitting element LED may include a first pixel electrode PEL1, a hole transport layer HTL1, a light emitting layer EML, an electron transport layer ETL, and a second pixel electrode PEL2. In an embodiment, the light receiving element LRD may include a first sensor electrode SEL1, a second hole transport layer HTL2, a light receiving layer LRL, an electron transport layer ETL, and a second sensor electrode SEL2.

In an embodiment, each of the first pixel electrode PEL1 and the first sensor electrode SEL1 may be formed of a metal layer made of silver (Ag), magnesium (Mg), aluminum (Al), platinum (Pt), palladium (Pd), gold (Au), nickel (Ni), neodymium (Nd), iridium (Ir), chrome (Cr), or an alloy thereof, and/or indium tin oxide (ITO), indium zinc oxide (IZO), zinc oxide (ZnO), indium tin zinc oxide (ITZO), or the like. The first pixel electrode PEL1 may be connected to the first connection pattern CNP1 through a contact hole. The first sensor electrode SEL1 may be connected to the second connection pattern CNP2 through a contact hole.

The first pixel electrode PEL1 and the second sensor electrode SEL1 may be simultaneously formed through a patterning process, for example, using a mask.

A bank layer BK (or a pixel defining layer) for defining a light emitting area and a light receiving area may be provided on the fourth insulating layer INS4 on which the first pixel electrode PEL1 and the first sensor electrode SEL1 are formed. The bank layer BK may be an insulating layer formed of organic material. The organic material may include acryl resin, epoxy resin, phenolic resin, polyamide resin, polyimide resin, or the like.

Furthermore, the bank layer BK may include light absorbing material, or a light absorbent layer may be applied to the bank layer BK, so that the bank layer BK can function to absorb external light. For example, the bank layer BNK may include carbon-based black pigment. However, the present disclosure is not limited thereto. The bank layer BK may include opaque metal, for example, such as chrome (Cr), molybdenum (Mo), an alloy (MoTi) of molybdenum and titanium, tungsten (W), vanadium (V), niobium (Nb), tantalum (Ta), manganese (Mn), cobalt (Co), or nickel (Ni), having high light absorptivity.

The bank layer BK may include openings corresponding to the light emitting area and the light receiving area.

The first hole transport layer HTL1 may be provided on an upper surface of the first pixel electrode PEL1 that is exposed from the bank layer BK. The second hole transport layer HTL2 may be provided on an upper surface of the first sensor electrode SEL1 that is exposed from the bank layer BK. Holes may be moved to the light emitting layer EML through the first hole transport layer HTL1. Holes may be moved to the light receiving layer LRL through the second hole transport layer HTL2.

In an embodiment, the first hole transport layer HTL1 and the second hole transport layer HTL2 may be identical to or different from each other, depending on the materials of the light emitting layer EML and the light receiving layer LRL.

The light emitting layer EML may be provided on the first hole transport layer HTL1. In an embodiment, the light emitting layer EML may be formed of an organic light emitting layer. The light emitting layer EML may emit light such as red light, green light, or blue light, depending on the organic material included in the light emitting layer EML. The light emitting layer EML may emit another color of light in another embodiment.

In an embodiment, an electron blocking layer may be provided on the second hole transport layer HTL2 in the light receiving area. The electron blocking layer may prevent charges of the light receiving layer LRL from being moved to the hole transfer layer HTL. In an embodiment, the electron blocking layer may be omitted.

The light receiving layer LRL may be disposed on the second hole transport layer HTL2. The light receiving layer LRL may sense the intensity of light by emitting electrons in response to light of a specific wavelength band.

In an embodiment, the light receiving layer LRL may include low-molecular organic material. For example, the light receiving layer LRL may be made of a phthalocyanine compound including one or more metals selected from the group consisting of copper (Cu), iron (Fe), nickel (Ni), cobalt (Co), manganese (Mn), aluminum (Al), palladium (Pd), tin (Sn), indium (In), lead (Pb), titanium (Ti), rubidium (Rb), vanadium (V), gallium (Ga), terbium (Tb), cerium (Ce), lanthanum (La), and zinc (Zn).

In one embodiment, the low-molecular organic material included in the light receiving layer LRL may be formed of a bi-layer structure including both a layer including a phthalocyanine compound including one or more metals selected from the group consisting of copper (Cu), iron (Fe), nickel (Ni), cobalt (Co), manganese (Mn), aluminum (Al), palladium (Pd), tin (Sn), indium (In), lead (Pb), titanium (Ti), rubidium (Rb), vanadium (V), gallium (Ga), terbium (Tb), cerium (Ce), lanthanum (La), and zinc (Zn) and a layer including C60, or may be formed of a mixing layer in which a phthalocyanine compound and C60 are mixed with each other. However, the foregoing is only for illustrative purposes, and the light receiving layer LRL may include a high-molecular organic layer.

In an embodiment, the light receiving layer LRL may determine a light detection band of the photo sensor by controlling selection of metal components included in the phthalocyanine compound. For example, a phthalocyanine compound including copper may absorb a visible light wavelength of a band ranging from approximately 600 nm to approximately 800 nm. A phthalocyanine compound including tin (Sn) may absorb a near-infrared ray wavelength of a band ranging from approximately 800 nm to approximately 1000 nm. Therefore, a photo sensor capable of detecting wavelengths of light in a predetermined band (e.g., desired by a user) can be implemented by controlling selection of metals to be included in the phthalocyanine compound. For example, the light receiving layer LRL may be formed to selectively absorb wavelengths of a red light band, wavelengths of a green light band, or wavelengths of a blue light band.

In an embodiment, the surface area of the light receiving area may be less than the surface area of the light emitting area. This is apparent, for example, from FIG. 4 where the LRD areas as smaller than the LED areas.

The second pixel electrode PEL2 and the second sensor electrode SEL2 may be provided on the electron transport layer ETL. In an embodiment, the second pixel electrode PEL2 and the second sensor electrode SEL2 may form a common electrode CD which is integrally formed in the display area AA. The second power voltage VSS may be supplied to the second pixel electrode PEL2 and the second sensor electrode SEL2.

The common electrode CD may be formed of a metal layer of material such as, but not limited to, silver (Ag), magnesium (Mg), aluminum (Al), platinum (Pt), palladium (Pd), gold (Au), nickel (Ni), neodymium (Nd), iridium (Ir), chrome (Cr), or an alloy thereof, and/or a transparent conductive layer formed of material such as ITO, IZO, ZnO, or ITZO. In an embodiment, the common electrode CD may be formed of a multi-layer structure having two or more layers including a thin metal layer. For example, the common electrode CD may be formed of a triple-layer structure of ITO/Ag/ITO.

An encapsulation layer TFE may be provided on the common electrode CD including the second pixel electrode PEL2 and the second sensor electrode SEL2. The encapsulation layer TFE may have a single-layer structure, or may have a multilayer structure. In an embodiment, the encapsulation layer TFE may have a stacked structure formed by successively depositing inorganic material, organic material, and inorganic material. An uppermost layer of the encapsulation layer TFE may be formed of inorganic material.

As described above, because the fifth semiconductor pattern ACT5 includes an oxide semiconductor, current leaking through the tenth transistor T10 may be minimized, and the accuracy of an sensing operation using the photo sensor including the sensor circuit SC may be improved. Furthermore, because the fifth semiconductor pattern ACT5 may extend only in the second direction DR2 or have a bar or linear shape, the width of the sensor circuit SC including the fifth semiconductor pattern ACT5 in the first direction DR1 may be reduced, so that the resolution degradation of the display area that is derived from addition of the sensor circuit SC may be reduced or minimized.

Figure 9:
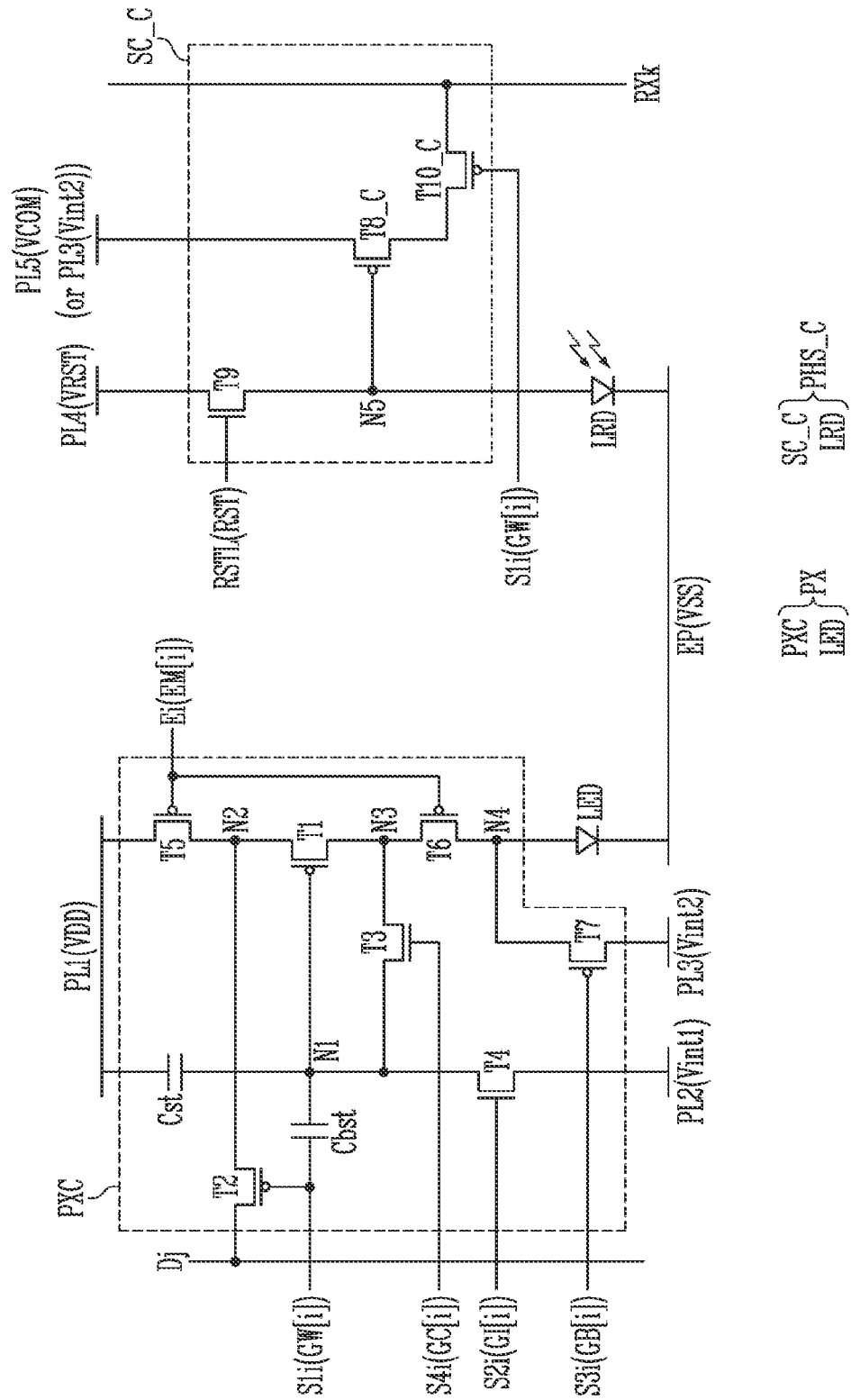
FIG. 9 is a circuit diagram illustrating a comparative example of a pixel and a photo sensor which are included in the display area of FIG. 4.
Figure 10:
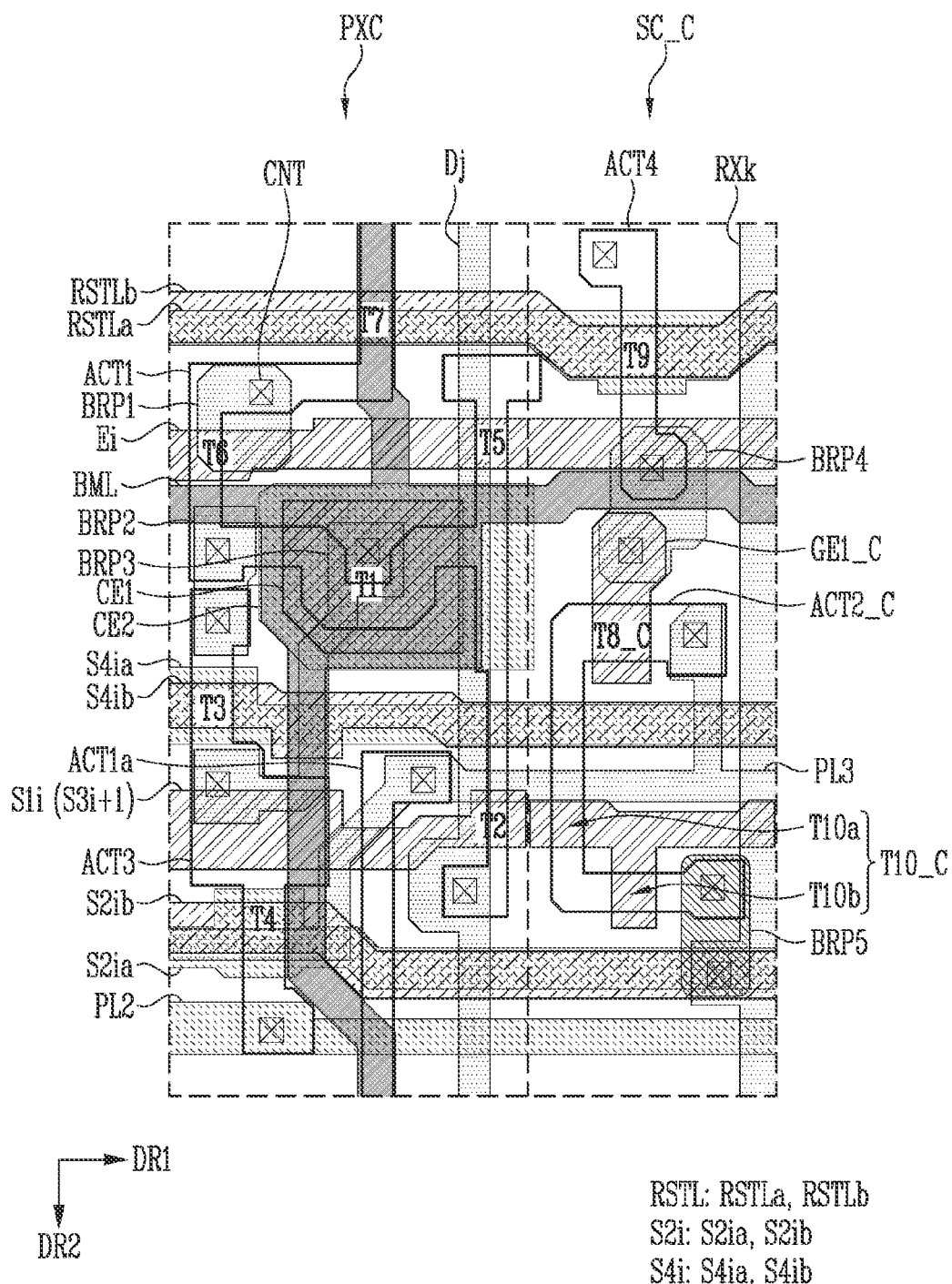
FIG. 10 is a plan view illustrating a comparative example of the display area of FIG. 4.

FIG. 9 is a circuit diagram illustrating a comparative example of the pixel and the photo sensor which are included in the display area of FIG. 4. FIG. 10 is a plan view illustrating a comparative example of the display area of FIG. 4.

Referring to FIGS. 4, 5, 7A to 7C, 9, and 10, a sensor circuit SC_C (and a pixel circuit PXC) of FIGS. 9 and 10, except an eighth transistor T8_C and a tenth transistor T10_C, may be identical or substantially similar to the sensor circuit SC (and the pixel circuit PXC) of FIGS. 5 and 7A to 7C. Therefore, repetitive explanation thereof will be omitted.

The sensor circuit SC_C may include the eighth transistor T8_C and the tenth transistor T10_C. Each of the eighth transistor T8_C and the tenth transistor T10_C may include a silicon semiconductor.

The tenth transistor T10_C may be connected between the eighth transistor T8_C and the k-th readout line RXk. A gate electrode of the tenth transistor T10_C may be connected to the 1i-th scan line S1i. Thus, the gate electrode of the tenth transistor T10_C and the gate electrode of the second transistor T2 may share the 1i-th scan line S1i.

As illustrated in FIG. 10, a second semiconductor pattern ACT2_C may include a vertical component extending in the second direction DR2, and a first horizontal component and a second horizontal component which are respectively extend from the opposite ends of the vertical components in the first direction DR1. This arrangement provides a C-shaped area which increases with width of the sensor circuit SC_C, and thus diminishes the resolution of the display device as described in detail below.

The first horizontal component of the second semiconductor pattern ACT2_C may overlap a first gate electrode GE1_C, and form a channel area of the eighth transistor T8_C. One end of the first horizontal component of the second semiconductor pattern ACT2_C may be connected to the third power line PL3. The third power line PL3 may be disposed in the same layer as the fourth bridge pattern BRP4 through the same process.

The vertical component of the second semiconductor pattern ACT2_C may overlap the 1i-th scan line S1i, and form a channel area of a first sub-transistor T10a. The second horizontal component of the second semiconductor pattern ACT2_C may overlap the 1i-th scan line S1i (or a protrusion protruding from the 1i-th scan line S1i in the second direction DR2), and form a second sub-transistor T10b. The first sub-transistor T10a and the second sub-transistor T10b may be included in the tenth transistor T10_C. To prevent leakage current from occurring, the tenth transistor T10_C may be implemented as a dual-gate transistor. One end of the second horizontal component of the second semiconductor pattern ACT2_C may be electrically connected to the k-th readout line RXk through the fifth bridge pattern BRP5.

To implement the tenth transistor T10_C as a dual-gate transistor, the second semiconductor pattern ACT2_C may have a C shape (or an L shape). Hence, the width of the sensor circuit SC_C in the first direction DR1 may be relatively increased. Specifically, the space for the sensor circuit SC_C is increased by horizontal space HOR (see FIG. 7A), whereby the resolution of the display area AA of the display panel 100 of FIGS. 2 and 3 may be decreased or otherwise degraded.

In the display device in accordance with embodiments of the present disclosure, the fifth semiconductor pattern ACT5 for the tenth transistor T10 (and the second semiconductor pattern ACT2 of the eighth transistor T8) may extend only in the second direction or have a linear or bar shape, so that the width of the sensor circuit SC including the fifth semiconductor pattern ACT5 in the first direction DR1 may be reduced, whereby the degradation in resolution of the display area can be reduced or minimized.

Figure 11:
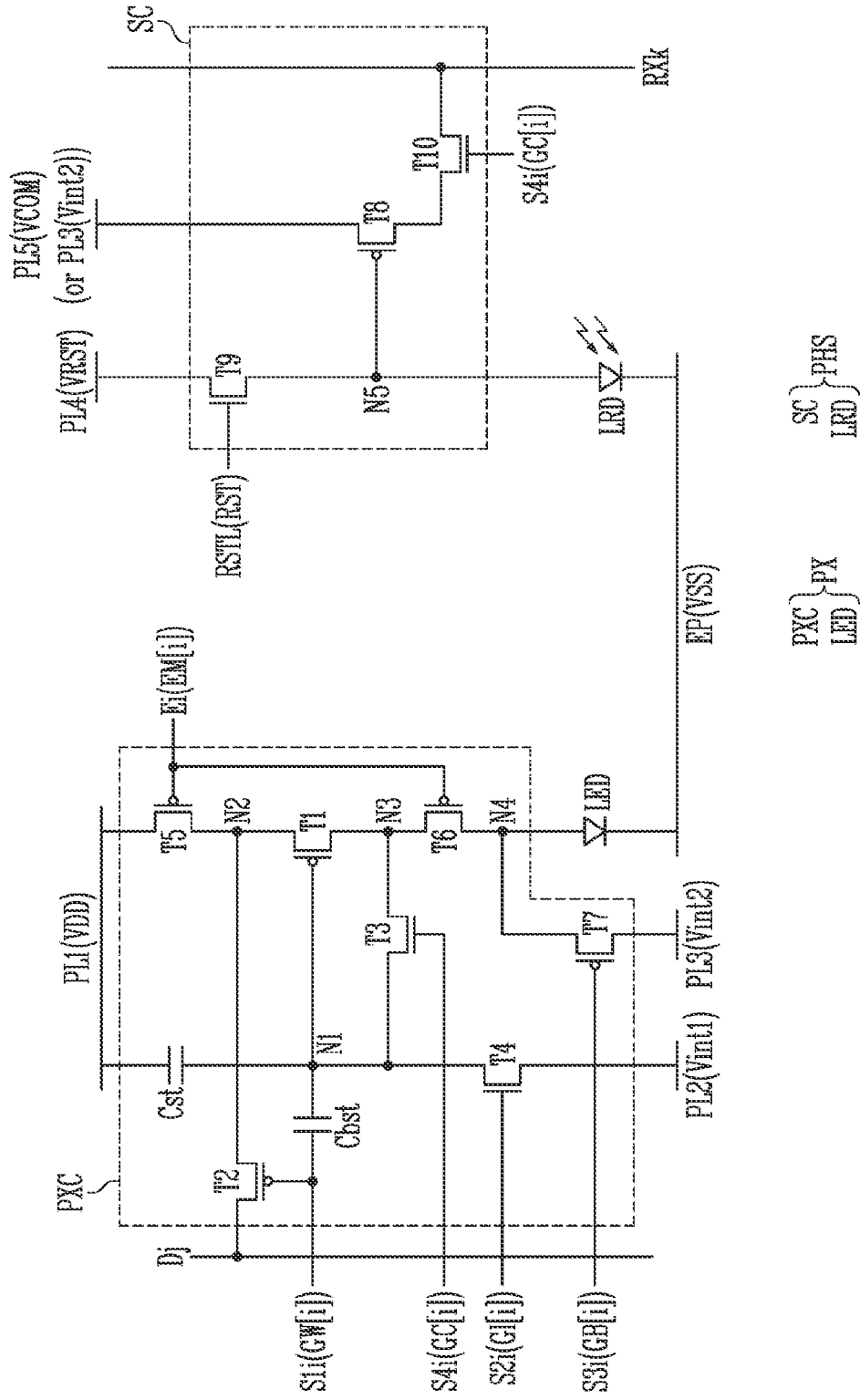
FIGS. 11 and 12 are circuit diagrams illustrating an example of the pixel and the photo sensor which are included in the display area of FIG. 4.
Figure 12:
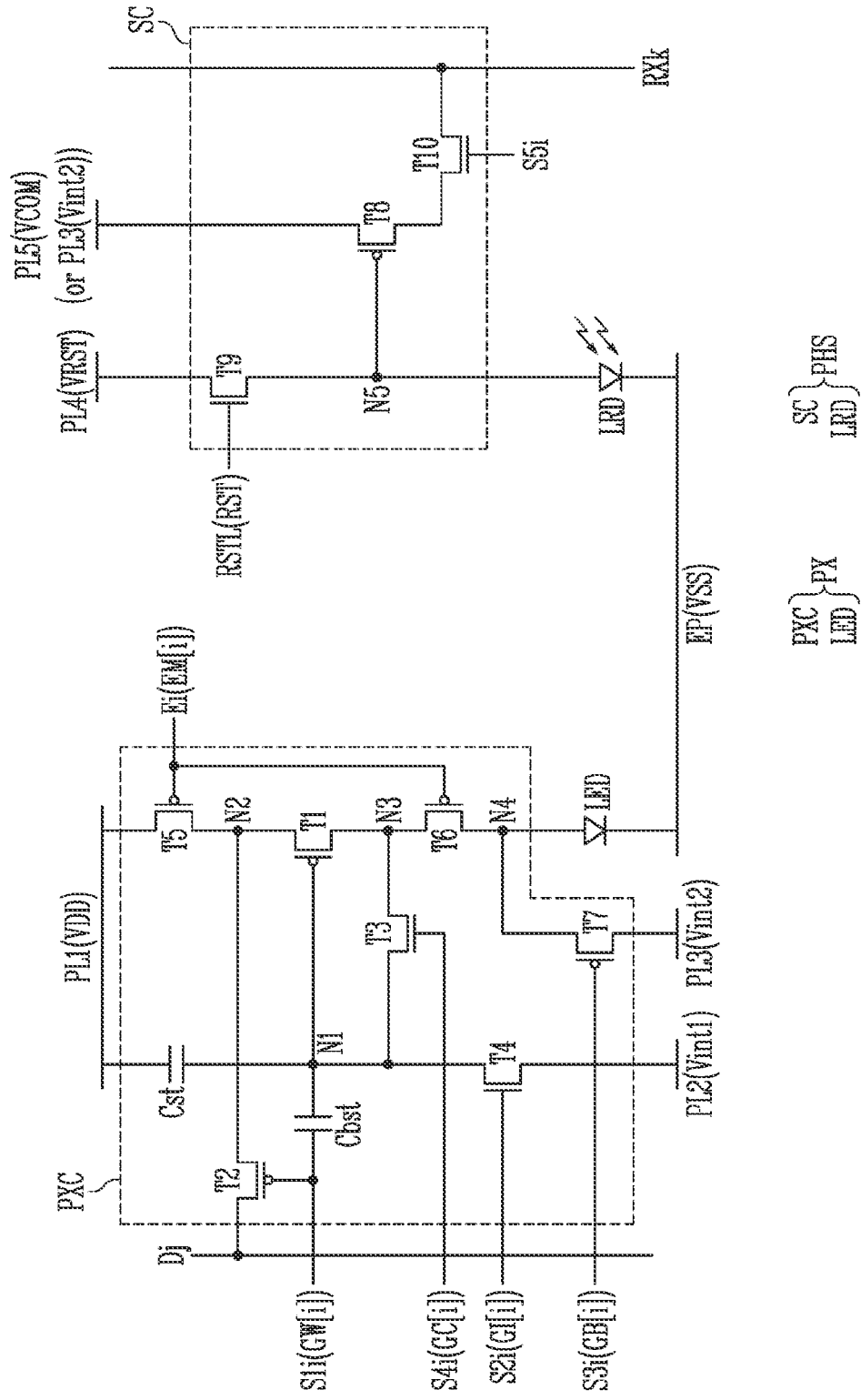

FIGS. 11 and 12 are circuit diagrams illustrating an example of the pixel and the photo sensor which are included in the display area of FIG. 4. In the embodiment of FIG. 11, the sensor circuit and the pixel circuit share a scan line different from the embodiment of FIG. 5. In the embodiment of FIG. 12, separate scan lines are used.

Referring to FIGS. 4, 5, 11, and 12, a sensor circuit SC and a pixel circuit PXC of FIGS. 11 and 12 may be identical or substantially similar to the sensor circuit SC (and the pixel circuit PXC) of FIG. 5, except for the scan line connected to the gate electrode of the tenth transistor T10. Therefore, repetitive explanation thereof will be omitted.

As illustrated in FIG. 11, the gate electrode of the tenth transistor T10 may be connected to the 4i-th scan line S4i. For example, the gate electrode of the tenth transistor T10 and the gate electrode of the third (compensation) transistor T3 may share the 4i-th scan line S4i.

If the tenth transistor T10 is turned on by a fourth scan signal GC[i] supplied to the 4i-th scan line S4i, a detection value (current and/or voltage) generated based on the voltage of the fifth node N5 may flow to the k-th readout line RXk.

The pixel circuit PXC and the sensor circuit SC may share the 4i-th scan line S4i, so that the pixel circuit PXC and the sensor circuit SC may be simultaneously scanned. In this case, the number of lines disposed on the display panel 100 (refer to FIG. 1) is relatively reduced, and a reduction in resolution due to the lines (e.g., a relatively large number of lines) can be mitigated. Furthermore, a driver (e.g., the scan driver 211) for driving the pixel PX and the photo sensor PHS may have an integrated structure, so that space for the driver can be reduced.

Here, the pixel circuit PXC and the sensor circuit SC are not limited to sharing the 4i-th scan line S4i. For example, as illustrated in FIG. 12, the gate electrode of the tenth transistor T10 may be connected to a separate 5i-th scan line S5i (or a fourth scan line). The 5i-th scan line S5i may be a separate scan line from the other i-th scan lines S1i to S4i. In this case as well, the sensing sensitivity of the photo sensor PHS including the sensor circuit SC may be enhanced by including an oxide semiconductor and using the fifth semiconductor pattern ACT5. Furthermore, the space for the sensor circuit SC may be reduced or minimized by using the fifth semiconductor pattern ACT5 extending in the second direction DR2, whereby the degradation in resolution of the display area may be mitigated.

In a display device in accordance with embodiments of the present disclosure, a switching transistor of a photo sensor connected to a readout line may include an oxide semiconductor. Therefore, current leaking from the photo sensor through the readout line may be reduced or minimized, and sensing sensitivity of the photo sensor may be enhanced.

Furthermore, in the display device, a semiconductor layer of the switching transistor (and transistors in the photo sensor) may extend in parallel to the readout line. Therefore, space to dispose the photo sensor in a direction perpendicular to the readout line of the photo sensor may be reduced, and degradation in resolution resulting from the disposition of the photo sensor may be mitigated.

Furthermore, in the display device, a pixel and the photo sensor may share a scan line. Hence, the number of lines disposed in a display panel may be relatively reduced, and degradation in resolution derived from the lines (e.g., a relatively large number of lines) may be mitigated.

The effects of the present disclosure are not limited by the foregoing, and other various effects are anticipated herein.

While the spirit and scope of the present disclosure are described by detailed exemplary embodiments, it should be noted that the above-described embodiments are merely descriptive and should not be considered limiting. It should be understood by those skilled in the art that various changes, substitutions, and alternations may be made herein without departing from the scope of the disclosure as defined by the following claims.

The scope of the present disclosure is not limited by detailed descriptions of the present specification, and should be defined by the accompanying claims. Furthermore, all changes or modifications of the present disclosure derived from the meanings and scope of the claims, and equivalents thereof should be construed as being included in the scope of the present disclosure. The embodiments may be combined to form additional embodiments.

What is claimed is:

1. A display device, comprising:
a pixel and a photo sensor,
wherein the pixel comprises:
a light emitting element,
a first transistor configured to control driving current flowing through the light emitting element in response to a voltage of a first node;
a second transistor configured to transmit a data signal from a data line to the first node in response to a scan signal provided to a first scan line;
a third transistor electrically connected between a gate electrode of the first transistor and one electrode of the first transistor, and including a gate electrode connected to a third scan line; and
a fourth transistor electrically connected between the gate electrode of the first transistor and a second power line, and including a gate electrode connected to a second scan line,
wherein each of the first transistor and the second transistor comprises a first type semiconductor, and
wherein each of the third transistor and the fourth transistor comprises a second type semiconductor different from the first type semiconductor,
wherein the photo sensor comprises:
a light receiving element;
a first sensor transistor configured to control current flowing to a readout line in response to a voltage of one electrode of the light receiving element; and
a second sensor transistor electrically connected between the first sensor transistor and the readout line,
wherein the first sensor transistor comprises the first type semiconductor, and
wherein the second sensor transistor comprises the second type semiconductor different from the first type semiconductor.

2. The display device according to claim 1, wherein:
the first sensor transistor comprises a silicon semiconductor, and
the second sensor transistor comprises an oxide semiconductor.

3. The display device according to claim 2, wherein a semiconductor layer of the second sensor transistor and a semiconductor layer of the first sensor transistor are disposed in different layers with at least one insulating layer interposed therebetween.

4. The display device according to claim 1, wherein:
the photo sensor is located between the pixel and an adjacent pixel disposed adjacent to the pixel in a first direction,
the readout line extends in a second direction, and
each of a semiconductor layer of the first sensor transistor and a semiconductor layer of the second sensor transistor extends in the second direction.

5. The display device according to claim 4, wherein a length of the semiconductor layer of the second sensor transistor in the second direction is greater than a width of the semiconductor layer of the second sensor transistor in the first direction.

6. The display device according to claim 1, wherein:
the photo sensor further comprises a third sensor transistor electrically connected between a reference power line and the one electrode of the light receiving element, the third sensor transistor including a gate electrode connected to a reset control line, and
the third sensor transistor comprises the second type semiconductor.

7. The display device according to claim 1, wherein a gate electrode of the second sensor transistor is connected to the second scan line.

8. The display device according to claim 7, wherein the second scan line comprises:
a first sub-scan line disposed under a semiconductor layer of the second sensor transistor, and
a second sub-scan line disposed over the semiconductor layer of the second sensor transistor.

9. The display device according to claim 1, wherein a gate electrode of the second sensor transistor is connected to the third scan line.

10. The display device according to claim 1, wherein a gate electrode of the second sensor transistor is connected to a fourth scan line different from the first to the third scan lines.

11. The display device according to claim 1, wherein the pixel further comprises a capacitor electrically connected between the first scan line and a gate electrode of the first transistor.

12. The display device according to claim 11, wherein the capacitor is formed by overlapping the first scan line and a semiconductor layer located in a same layer as a semiconductor layer of the second sensor transistor.

13. An electronic device, comprising:
a display device comprising a pixel and a photo sensor,
wherein the pixel comprises:
a light emitting element;
a first transistor configured to control driving current flowing through the light emitting element in response to a voltage of a first node;
a second transistor electrically connected between a data line and a first electrode of the first transistor, and including a gate electrode connected to a first scan line;
a third transistor electrically connected between a gate electrode of the first transistor and a second electrode of the first transistor, and including a gate electrode connected to a third scan line; and
a fourth transistor electrically connected between the gate electrode of the first transistor and a second power line, and including a gate electrode connected to a second scan line,
wherein the photo sensor comprises:
a light receiving element;
a first sensor transistor configured to control current flowing to a readout line in response to a voltage of one electrode of the light receiving element; and
a second sensor transistor electrically connected between the first sensor transistor and the readout line, and
wherein a gate electrode of the second sensor transistor is connected to the second scan line or the third scan line.

14. The electronic display device according to claim 13, wherein the gate electrode of the second sensor transistor is connected to the second scan line.

15. The electronic display device according to claim 13, wherein the gate electrode of the second sensor transistor is connected to the third scan line.

\* \* \* \* \*